(12) United States Patent
Carlyon

(10) Patent No.: US 10,113,768 B2
(45) Date of Patent: Oct. 30, 2018

(54) INSULATED PANEL ASSEMBLY

(71) Applicant: MITEK HOLDINGS, INC., Wilmington, DE (US)

(72) Inventor: Zeke Carlyon, Vassar, MI (US)

(73) Assignee: MITEK HOLDINGS, INC., Wilmington, DE (US)

( * ) Notice: Subject to any disclaimer, the term of this patent is extended or adjusted under 35 U.S.C. 154(b) by 66 days.

(21) Appl. No.: 15/005,705

(22) Filed: Jan. 25, 2016

(65) Prior Publication Data
US 2016/0215997 A1 Jul. 28, 2016

Related U.S. Application Data

(60) Provisional application No. 62/106,858, filed on Jan. 23, 2015.

(51) Int. Cl.
*B65D 25/00* (2006.01)
*F24F 13/02* (2006.01)
(Continued)

(52) U.S. Cl.
CPC ............ *F24F 13/0263* (2013.01); *B32B 3/04* (2013.01); *B32B 3/06* (2013.01); *B32B 3/28* (2013.01); *B32B 5/20* (2013.01); *B32B 7/045* (2013.01); *B32B 7/14* (2013.01); *B32B 15/046* (2013.01); *F24F 13/20* (2013.01); *B32B 3/08* (2013.01); *B32B 7/08* (2013.01); *B32B 15/043* (2013.01); *B32B 2250/44* (2013.01); *B32B 2266/0278* (2013.01); *B32B 2307/304* (2013.01);
(Continued)

(58) Field of Classification Search
CPC ......... F24F 13/0263; F24F 13/20; B32B 3/28;
B32B 3/06; B32B 3/04; B32B 15/046;
B32B 7/045; B32B 5/20; B32B 7/14;
B32B 2266/0278; B32B 2250/44; B32B
2509/00; B32B 2457/00; B32B 2307/72;
B32B 7/08; B32B 3/08; B32B 15/043
USPC ................................................ 220/677–693
See application file for complete search history.

(56) References Cited

U.S. PATENT DOCUMENTS 1,637,871 A 8/1927 Nosan
1,844,498 A 2/1932 Candy
(Continued)

FOREIGN PATENT DOCUMENTS

JP 07150629 A 6/1995
JP 08281487 A 10/1996
(Continued)

OTHER PUBLICATIONS

Hardy Frames, Inc. HFX Series, The Hardy Frame® Wall Bracing Method, The Hardy Frame® 9" and 12" wide Panels, 4 pages, 2012, Ventura, California, United States.
(Continued)

*Primary Examiner* — Kareen Thomas
(74) *Attorney, Agent, or Firm* — Senniger Powers LLP

(57) ABSTRACT

Insulated panel assemblies can be used to construct an air-handling enclosure and the like. The insulated panel assemblies can have the same configuration and fit together to form a substantially sealed, insulated enclosure. The insulated panel assemblies themselves are particularly constructed for ease of formation and construction of the panel assemblies. A method of forming insulated panel assembly is also disclosed.

15 Claims, 35 Drawing Sheets

(51) Int. Cl.
  *B32B 7/14*   (2006.01)
  *B32B 5/20*   (2006.01)
  *B32B 7/04*   (2006.01)
  *B32B 3/04*   (2006.01)
  *B32B 3/06*   (2006.01)
  *B32B 3/28*   (2006.01)
  *F24F 13/20*  (2006.01)
  *B32B 7/08*   (2006.01)
  *B32B 3/08*   (2006.01)
  *B32B 15/04*  (2006.01)

(52) U.S. Cl.
  CPC ....... *B32B 2307/72* (2013.01); *B32B 2457/00* (2013.01); *B32B 2509/00* (2013.01); *B32B 2607/00* (2013.01)

(56) References Cited

U.S. PATENT DOCUMENTS

| | | | |
|---|---|---|---|
| 1,984,007 | A | 12/1934 | Babbitt |
| 2,039,601 | A | 5/1936 | London |
| 2,293,399 | A | 8/1942 | Moecker, Jr. et al. |
| 2,304,718 | A | 12/1942 | Swart |
| 2,327,585 | A | 8/1943 | Ulrich |
| 2,553,363 | A | 5/1951 | Droeger |
| 2,703,559 | A | 3/1955 | Godshalk |
| 3,037,590 | A | 6/1962 | Pavlecka |
| 3,153,817 | A | 10/1964 | Pease, Jr. |
| 3,176,807 | A | 4/1965 | Pavlecka |
| 3,289,372 | A | 12/1966 | Adams et al. |
| 3,310,926 | A | 3/1967 | Brandreth et al. |
| 3,461,636 | A | 8/1969 | Hern |
| 3,640,039 | A | 2/1972 | McKee et al. |
| 3,662,509 | A | 5/1972 | Studzinski |
| 3,670,466 | A | 6/1972 | Lynch |
| 3,716,959 | A | 2/1973 | Bernardi |
| 3,729,889 | A | 5/1973 | Baruzzini |
| 3,786,609 | A | 1/1974 | Difazio |
| 3,837,134 | A | 9/1974 | DiFazio |
| 3,952,472 | A | 4/1976 | Boehmig |
| 3,971,179 | A | 7/1976 | Bodocsi et al. |
| 4,014,150 | A | 3/1977 | Wells et al. |
| 4,074,947 | A | 2/1978 | Matake et al. |
| 4,170,952 | A * | 10/1979 | McCown ................ B63B 25/16 114/74 A |
| 4,190,305 | A * | 2/1980 | Knight ...................... E04H 5/10 220/592.1 |
| 4,223,505 | A | 9/1980 | Krebel et al. |
| 4,251,972 | A | 2/1981 | Interlante |
| 4,263,763 | A | 4/1981 | Bouwens |
| 4,274,239 | A | 6/1981 | Carroll |
| 4,311,460 | A | 1/1982 | Lauersdorf et al. |
| 4,346,543 | A | 8/1982 | Wilson et al. |
| 4,373,312 | A | 2/1983 | Kim |
| 4,434,592 | A | 3/1984 | Reneault et al. |
| 4,486,994 | A | 12/1984 | Fisher et al. |
| 4,651,489 | A | 3/1987 | Hodges et al. |
| 4,686,803 | A | 8/1987 | Couderc et al. |
| 4,744,186 | A | 5/1988 | Smith et al. |
| 4,764,108 | A | 8/1988 | Carthew et al. |
| 4,905,436 | A | 3/1990 | Matsuo et al. |
| 5,036,638 | A | 8/1991 | Kurtz, Jr. |
| 5,056,290 | A | 10/1991 | Alexander et al. |
| 5,148,642 | A | 9/1992 | Plumier et al. |
| 5,216,810 | A | 6/1993 | Kendall |
| 5,379,561 | A | 1/1995 | Saito |
| 5,561,959 | A | 10/1996 | Alderman et al. |
| 5,660,017 | A | 8/1997 | Houghton |
| 5,680,738 | A | 10/1997 | Allen et al. |
| 5,687,956 | A | 11/1997 | Vesper |
| 5,694,730 | A | 12/1997 | Del Rincon et al. |
| 5,724,784 | A | 3/1998 | Menchetti |
| 5,758,464 | A | 6/1998 | Hatton |
| 5,913,794 | A | 6/1999 | Chen |
| 5,934,033 | A | 8/1999 | Matsuyama et al. |
| 6,012,256 | A | 1/2000 | Aschheim |
| 6,074,206 | A | 6/2000 | Lauersdorf |
| 6,138,427 | A | 10/2000 | Houghton |
| 6,148,583 | A | 11/2000 | Hardy |
| 6,158,190 | A | 12/2000 | Seng |
| 6,167,624 | B1 | 1/2001 | Lanahan et al. |
| 6,237,303 | B1 | 5/2001 | Allen et al. |
| 6,289,646 | B1 | 9/2001 | Watanabe |
| 6,345,511 | B1 | 2/2002 | Esty et al. |
| 6,374,571 | B1 | 4/2002 | Mann |
| 6,412,237 | B1 | 7/2002 | Sahai |
| 6,427,393 | B1 | 8/2002 | Chen et al. |
| 6,494,012 | B2 | 12/2002 | Seng |
| 6,530,191 | B2 | 3/2003 | Rieke et al. |
| 6,546,690 | B1 * | 4/2003 | Lamberts ................ E04C 3/285 52/786.1 |
| 6,584,742 | B1 | 7/2003 | Kligler et al. |
| 6,591,573 | B2 | 7/2003 | Houghton |
| 6,668,508 | B2 | 12/2003 | Boone et al. |
| 6,681,538 | B1 | 1/2004 | Sarkisian |
| 6,694,694 | B2 | 2/2004 | Zeeff |
| 6,694,702 | B2 | 2/2004 | Weymer et al. |
| 6,739,099 | B2 | 5/2004 | Takeuchi et al. |
| 6,868,648 | B2 | 3/2005 | Glover et al. |
| 6,923,493 | B2 | 8/2005 | Buchholz et al. |
| 6,974,383 | B2 | 12/2005 | Lewis et al. |
| 7,000,304 | B2 | 2/2006 | Sarkisian |
| 7,047,695 | B2 | 5/2006 | Allen et al. |
| 7,107,731 | B2 | 9/2006 | Record |
| 7,178,296 | B2 | 2/2007 | Houghton |
| 7,383,665 | B2 | 6/2008 | Frobosilo |
| 7,497,054 | B2 | 3/2009 | Takeuchi et al. |
| 7,637,076 | B2 | 12/2009 | Vaughn |
| 7,832,162 | B1 | 11/2010 | Abdel-Rahman et al. |
| 7,849,647 | B2 | 12/2010 | Lucey et al. |
| 7,849,651 | B2 | 12/2010 | Fujito et al. |
| 7,874,120 | B2 | 1/2011 | Ohata et al. |
| 7,900,411 | B2 | 3/2011 | Antonic |
| 8,061,929 | B2 | 11/2011 | Dagesse |
| 8,127,502 | B2 | 3/2012 | Hulls et al. |
| 8,146,322 | B2 | 4/2012 | Karns |
| 8,151,539 | B2 | 4/2012 | Grinsted |
| 8,186,119 | B1 | 5/2012 | Huff et al. |
| 8,205,408 | B2 | 6/2012 | Houghton et al. |
| 8,286,399 | B2 | 10/2012 | Brown |
| 8,353,135 | B2 | 1/2013 | Sarkisian |
| 8,375,652 | B2 | 2/2013 | Hiriyur et al. |
| 8,397,445 | B2 | 3/2013 | Ohnishi et al. |
| 8,468,775 | B2 | 6/2013 | Vaughn |
| 8,511,025 | B2 | 8/2013 | Kawai et al. |
| 8,513,572 | B2 * | 8/2013 | Schumacher ........ F26B 25/009 219/388 |
| 8,658,274 | B2 | 2/2014 | Chen et al. |
| 8,844,243 | B1 | 9/2014 | Gillman |
| 9,027,301 | B2 | 5/2015 | Guinn |
| 9,091,065 | B2 | 7/2015 | Tran et al. |
| 9,309,671 | B2 | 4/2016 | Van Sloun et al. |
| 9,677,711 | B2 * | 6/2017 | Boyeau .................... F17C 3/027 |
| 2001/0052205 | A1 | 12/2001 | Herren |
| 2002/0023401 | A1 | 2/2002 | Budge |
| 2002/0100229 | A1 | 8/2002 | Chen et al. |
| 2002/0124520 | A1 | 9/2002 | Bock et al. |
| 2003/0009969 | A1 | 1/2003 | Herbeck et al. |
| 2003/0009977 | A1 | 1/2003 | Houghton |
| 2004/0010992 | A1 | 1/2004 | Sarkisian |
| 2004/0055248 | A1 | 3/2004 | Grillos |
| 2004/0244330 | A1 | 12/2004 | Takeuchi et al. |
| 2004/0247378 | A1 | 12/2004 | Sarkisian |
| 2005/0055935 | A1 | 3/2005 | Layfield |
| 2005/0204684 | A1 | 9/2005 | Houghton |
| 2005/0247007 | A1 | 11/2005 | Iri et al. |
| 2006/0026925 | A1 | 2/2006 | Layfield |
| 2006/0144006 | A1 | 7/2006 | Suzuki et al. |
| 2006/0174577 | A1 | 8/2006 | O'Neil |
| 2007/0094992 | A1 | 5/2007 | Antonic |
| 2007/0245640 | A1 | 10/2007 | Bergqvist |
| 2007/0261345 | A1 | 11/2007 | Janka et al. |
| 2007/0289230 | A1 | 12/2007 | Schroeder, Sr. et al. |

(56) References Cited

U.S. PATENT DOCUMENTS

| | | | |
|---|---|---|---|
| 2008/0148681 A1 | 6/2008 | Hiriyur et al. |
| 2008/0289267 A1 | 11/2008 | Sarkisian |
| 2009/0100780 A1 | 4/2009 | Mathis et al. |
| 2009/0205277 A1 | 8/2009 | Gibson |
| 2010/0011699 A1 | 1/2010 | Weimer et al. |
| 2010/0018151 A1 | 1/2010 | Hiriyur |
| 2010/0126111 A1 | 5/2010 | Leonard |
| 2010/0132286 A1 | 6/2010 | Hovey, Jr. |
| 2010/0192485 A1 | 8/2010 | Sarkisian |
| 2011/0047889 A1 | 3/2011 | Gad et al. |
| 2011/0194892 A1 | 8/2011 | Huang |
| 2011/0296787 A1 | 12/2011 | Pryor et al. |
| 2012/0240512 A1 | 9/2012 | Ting |
| 2013/0025222 A1 | 1/2013 | Mueller |
| 2015/0159362 A1 | 6/2015 | Pryor et al. |
| 2016/0130820 A1 | 5/2016 | Cullen |
| 2016/0215997 A1 | 7/2016 | Carlyon |

FOREIGN PATENT DOCUMENTS

| | | | |
|---|---|---|---|
| JP | 2000054560 A | 2/2000 |
| JP | 2004353419 A | 12/2004 |
| JP | 2011208434 A | 10/2011 |

OTHER PUBLICATIONS

USP Structural Connectors, Hardy Frame, Inc., HFX Series Panels and Brace Frames, pp. 206-209, 2013, Ventura, California, United States.

\* cited by examiner

INSULATED PANEL ASSEMBLY

FIELD OF THE INVENTION

The present invention generally relates to air handling enclosures, and more specifically to a thermally insulating panel assembly for forming an air handling enclosure.

BACKGROUND

The use of air handling enclosures for HVAC equipment (e.g., heat exchangers, compressors, blowers, filters, fans, motors, cooling elements, heating elements, humidifying elements) is commonplace. Air handling enclosures are often constructed with panels filled with insulation to minimize the transmission of thermal energy from the interior to the exterior of the enclosure. Typically, the panels include inner and outer (first and second) panel members of metal that are joined together to form a volume that receives the insulation. The panel members can be connected together using plastic components to reduce thermal transmission. However, the inner and outer panel members are often difficult to manufacture, and it can be difficult and time-consuming to attach the panel members with the plastic components.

SUMMARY

In one aspect of the present invention, an insulated panel assembly for use in forming an air handling enclosure generally comprises a first panel member having a base portion. First and second side portions extend from the base portion, and first and second side mounting flanges extend from the respective first and second side portions. A second panel member has a base portion, first and second side portions extending from the base portion, and first and second side mounting flanges extending from the respective first and second side portions. A double-sided adhesive strip attaches the first and second side mounting flanges of the first panel member to the respective first and second side mounting flanges of the second panel member. The first and second panel members are arranged with respect to each other so that at least a portion of the first panel member extends beyond a corresponding portion of the second panel member.

In another aspect of the present invention, a panel member of an insulated panel assembly generally comprises a base portion and a maximum of two bends on each edge margin of the base portion.

In yet another aspect of the present invention, a corner jig for use in assembling an insulated panel assembly having a first panel member and a second panel member attached by double-sided adhesive strip. The corner jig generally comprises a first side wall and a first end wall arranged to define a first recess. The first recess is configured to receive a corner of the first panel member. A second side wall and a second end wall are arranged to define a second recess positioned generally above the first recess. The second recess is configured to receive a corner of the second panel member. The first and second recesses are configured such that when the first and second panel members are received in the first and second recesses, at least a portion of one of the first and second panel members extends beyond a corresponding portion of the other of the first and second panel members.

In a still further aspect of the present invention, a method of assembling an insulated panel assembly for use in forming an air handling enclosure includes the step of placing a second panel member of the insulated panel assembly in a first recess of a corner jig. A double-sided adhesive strip is attached to mounting flanges of the second panel member. A first panel member of the insulated panel assembly is placed in a second recess of the corner jig such that the first panel member is adhered to the second panel member by the double-sided adhesive strip. The corner jig maintains the correct positional relationship between the first and second panel members for attachment by the double-sided adhesive strip. Insulation is provided between the first and second panel members.

Other objects and features of the present invention will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
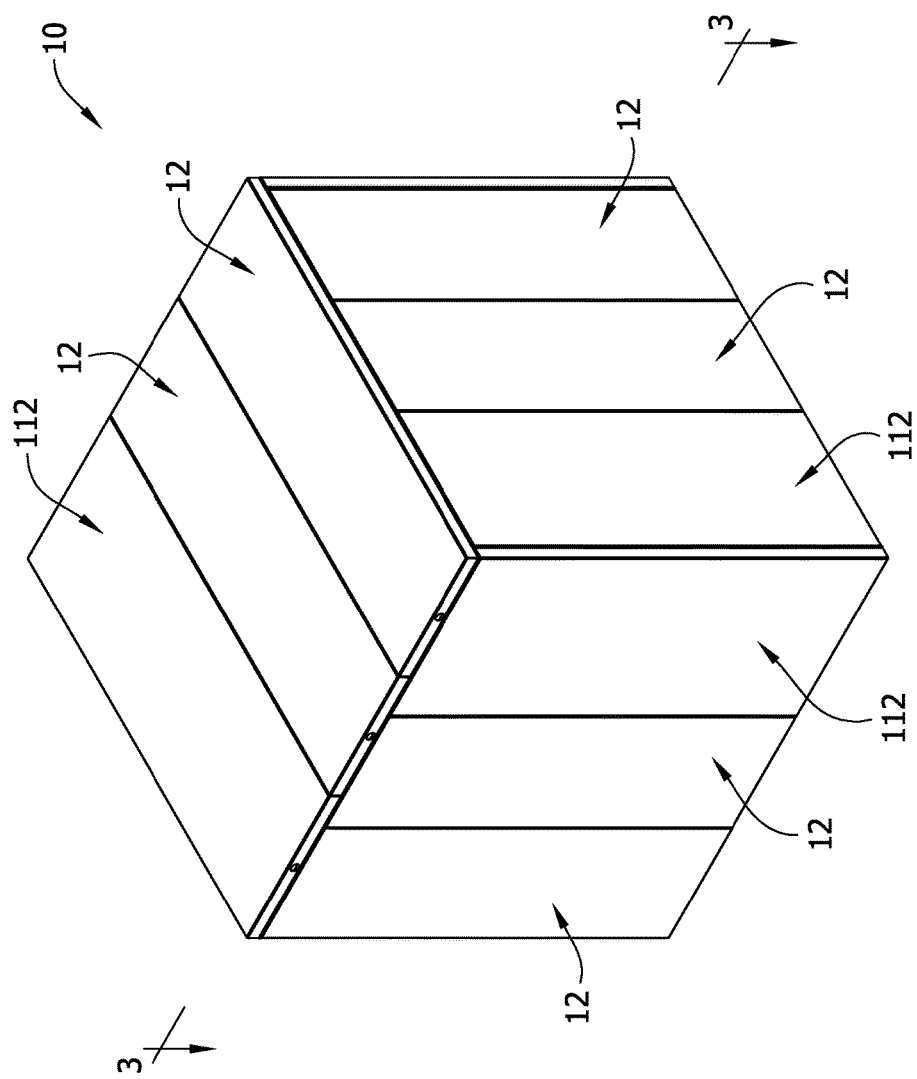
FIG. 1 is a perspective of an air handling enclosure formed from insulated panel assemblies.
Figure 2:
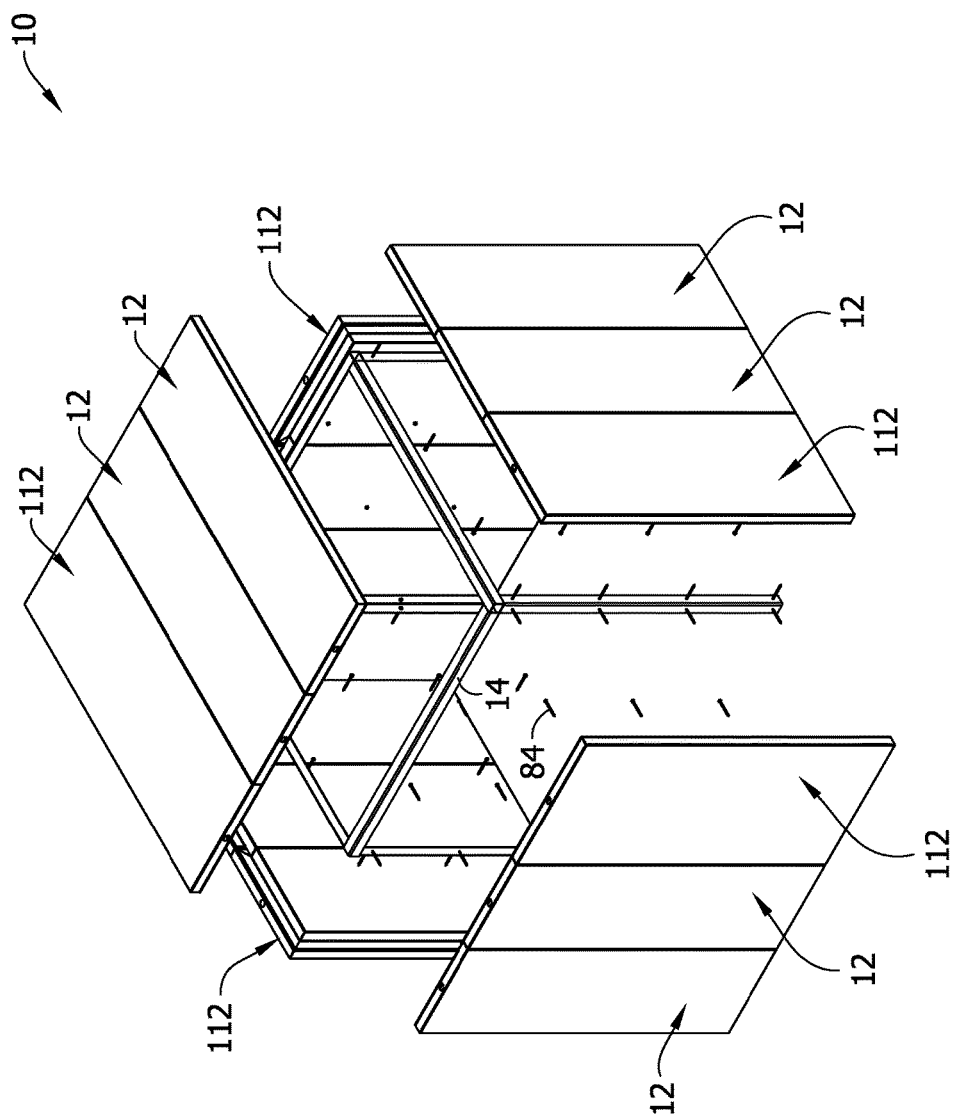
FIG. 2 is an exploded perspective of the air handling enclosure of FIG. 1.
Figure 3:
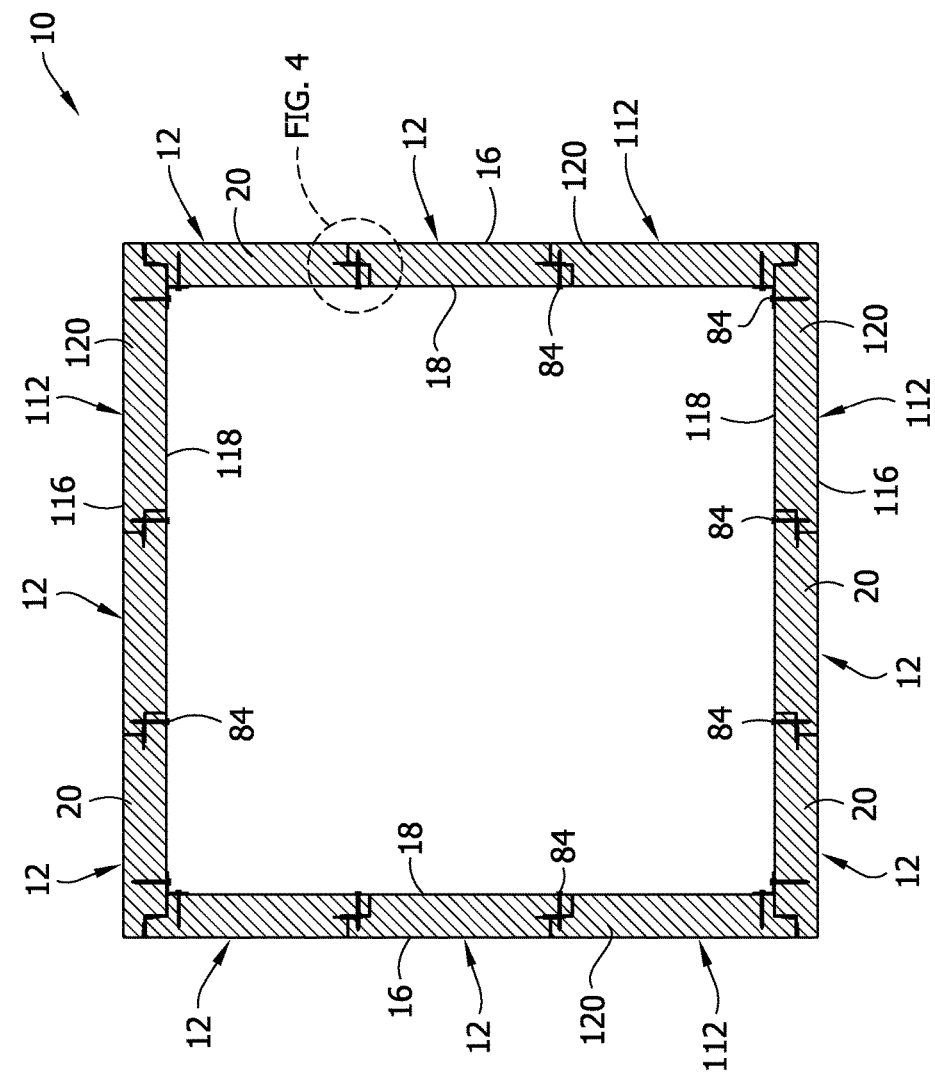
FIG. 3 is a section taken along line 3-3 of FIG. 1.

Referring to FIGS. 1-3, an air handling enclosure for housing air-handling equipment (e.g., fans, motors, cooling elements, heating elements, and/or humidifying elements) is shown generally at 10. The enclosure 10 comprises a number of insulated panel assemblies 12 and insulated panel assemblies 112. The insulated panel assemblies are attached to each other, as described below, and may also be attached to a frame 14 and a base (not shown) to form the air handling enclosure 10. The insulated panel assemblies 12, 112 form an air handling enclosure 10 that is thermally insulated to minimize heating and cooling losses.

Figure 4:
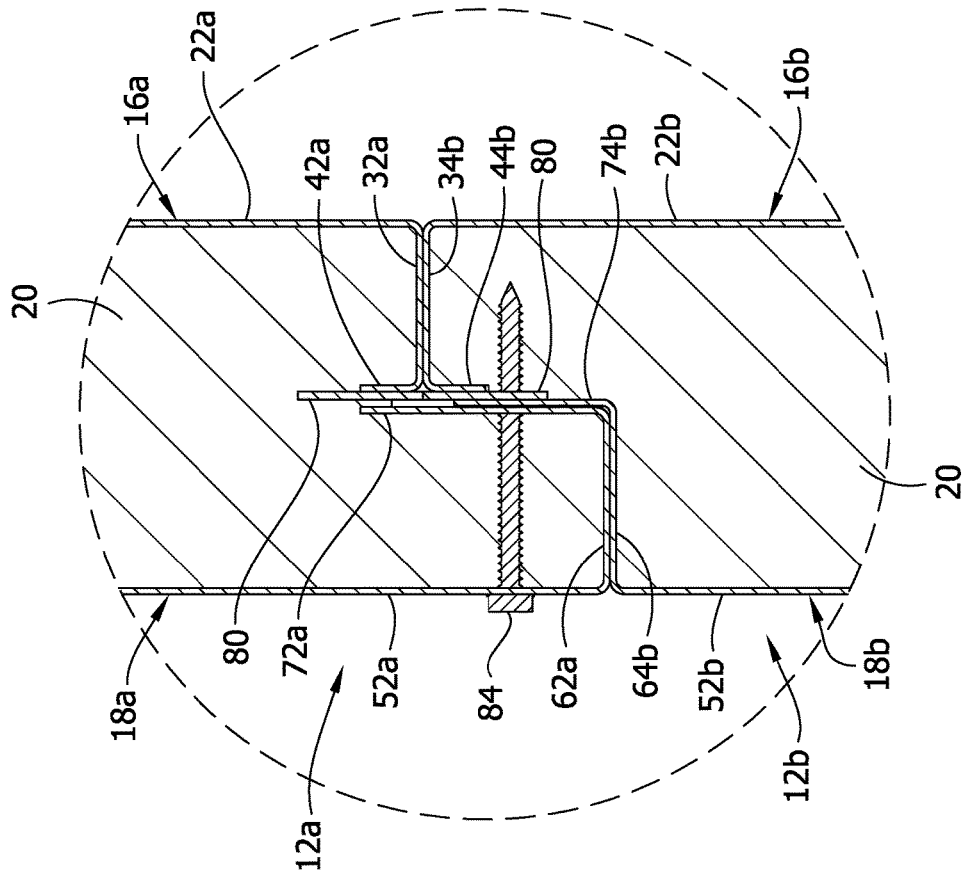
FIG. 4 is an enlarged fragmentary portion of FIG. 3.
Figure 5:
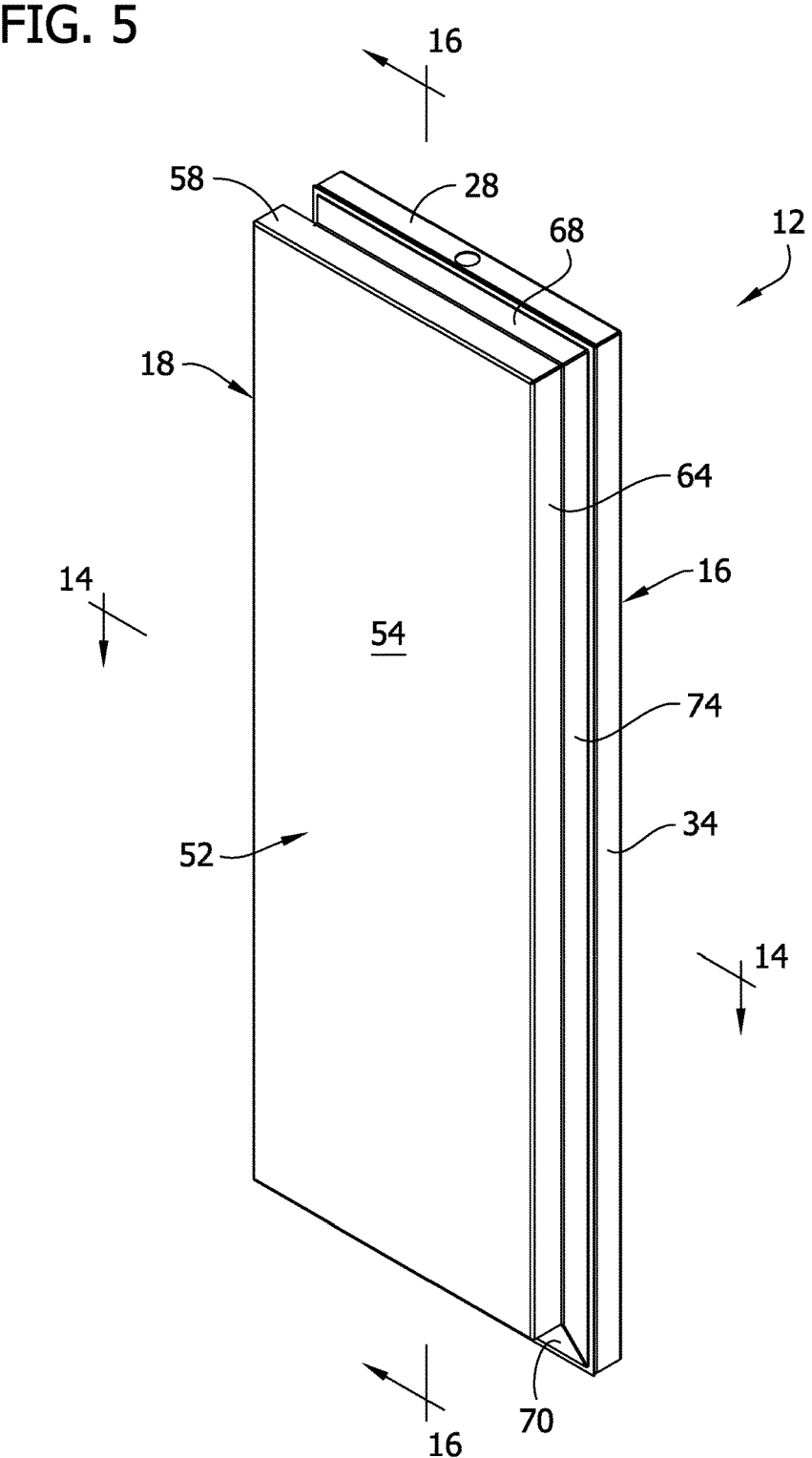
FIG. 5 is a perspective of an insulated panel assembly according to a first embodiment of the present invention.
Figure 6:
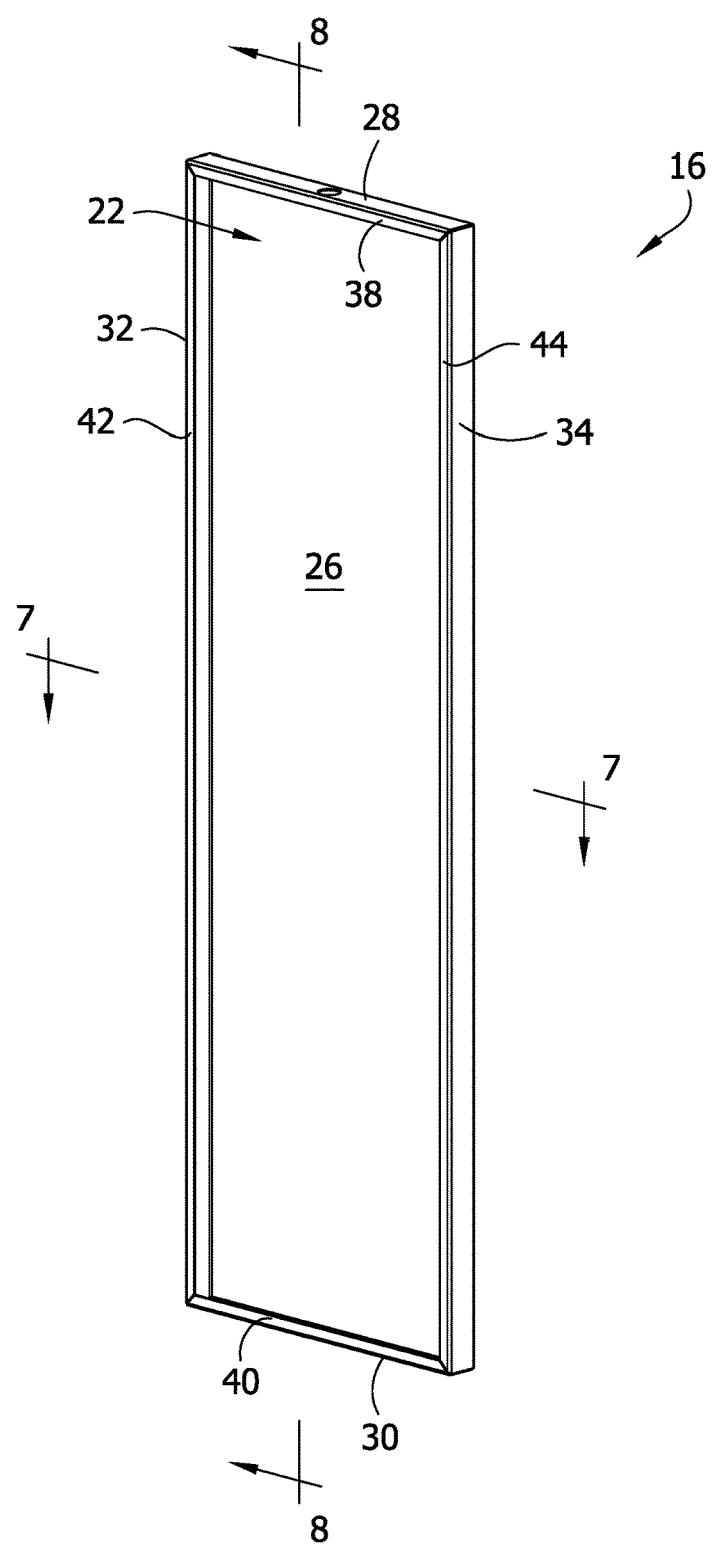
FIG. 6 is a perspective of a first panel member of the insulated panel assembly of FIG. 5.
Figure 7:
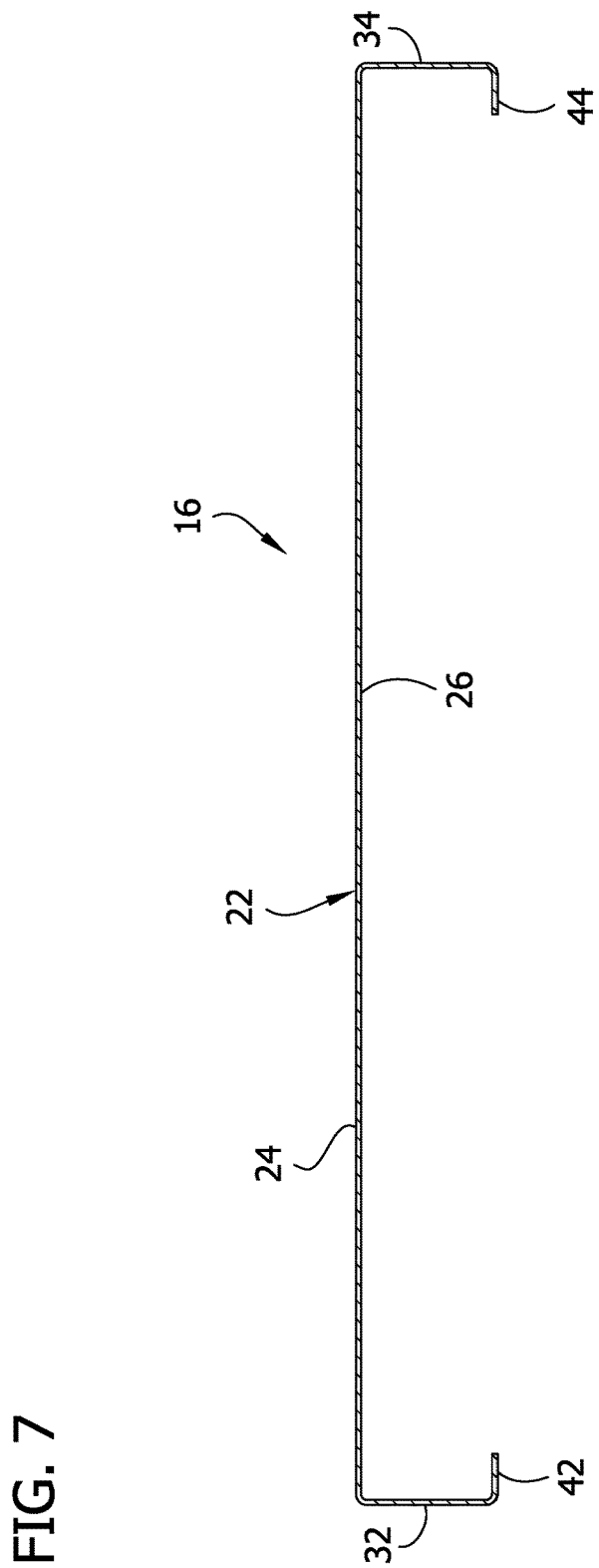
FIG. 7 is a section taken along line 7-7 of FIG. 6.
Figure 8:
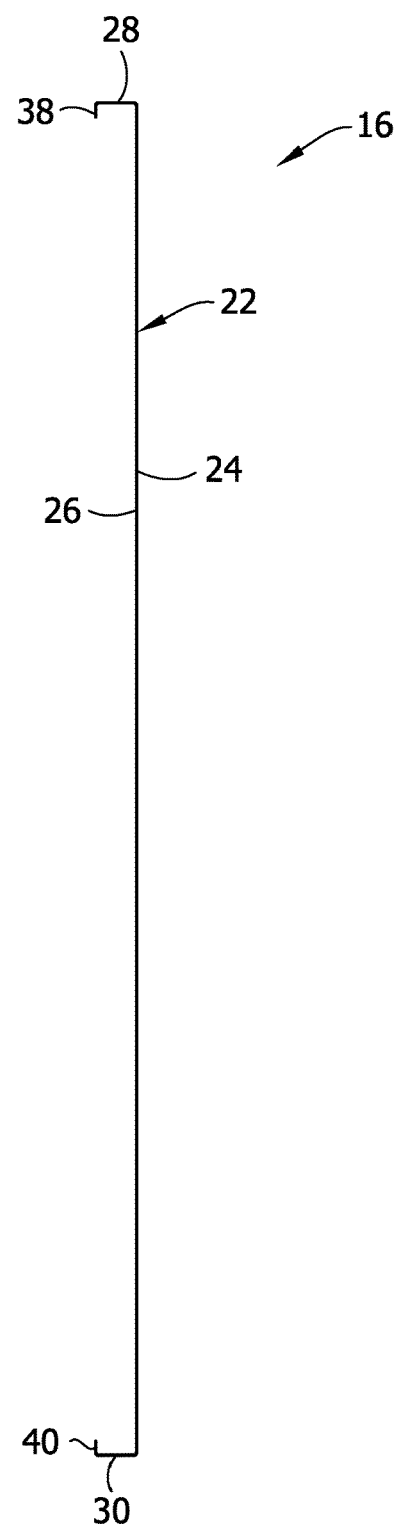
FIG. 8 is a section taken along line 8-8 of FIG. 6.

As seen in FIGS. 3-5, each panel assembly 12 includes a first panel member 16, a second panel member 18, and a thermal insulating core 20. Referring to FIGS. 6-8, the first panel member 16 includes a base portion 22 having an outer face 24 and an inner face 26. A top portion 28 extends from a top edge margin of the base portion 22. The top portion 28 extends generally perpendicular from the base portion 22 in a direction inward away from the inner face 26. A bottom portion 30 extends from a bottom edge margin of the base portion 22 opposite the top portion 28. The bottom portion 30 extends generally perpendicular from the base portion 22 in a direction inward away from the inner face 26, such that the bottom portion and the top portion are generally in spaced parallel alignment. A first side portion 32 extends from a first side edge margin of the base portion 22. The first side portion 32 extends generally perpendicular from the base portion 22 in a direction inward away from the inner face 26. A second side portion 34 extends from a second side edge margin of the base portion 22 opposite the first side portion 32. The second side portion 34 extends generally perpendicular from the base portion 22 in a direction inward away from the inner face 26, such that the first and second side portions are generally in spaced parallel alignment.

Referring still to FIGS. 6-8, each of the top, bottom, and first and second side portions 28, 30, 32, 34 of the first panel member 16 includes a mounting flange configured for attachment to the second panel member 18. A top mounting flange 38 extends generally perpendicular from the top portion 28 in a direction toward the bottom portion 30. A bottom mounting flange 40 extends generally perpendicular from the bottom portion 30 in a direction toward the top portion 28. A first side mounting flange 42 extends generally perpendicular from the first side portion 32 in a direction toward the second side portion 34. A second side mounting flange 44 extends generally perpendicular from the second side portion 34 in a direction toward the first side portion 32. The mounting flanges 38, 40, 42, 44 preferably lie in the same plane for level attachment to the second panel member 18.

Figure 9:
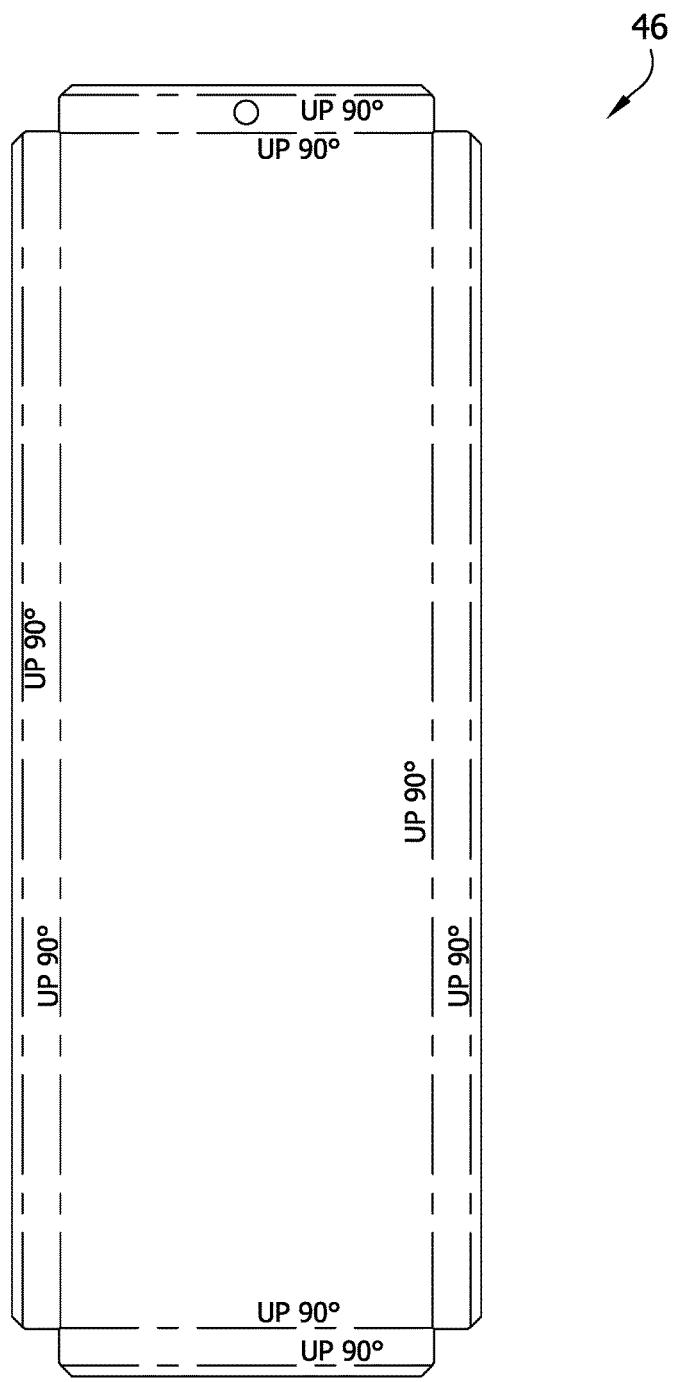
FIG. 9 is a top view of a metal blank for forming a first panel member of an insulated panel assembly according to a first embodiment of the present invention.

As seen in FIG. 9, the first panel member 16 can be formed as one piece from a metal blank 46 that is stamped from a sheet metal roll and bent into shape. The first panel member 16 can be stamped from galvanized steel, stainless steel, aluminum, or any other suitable material. The first panel member 16 is preferably formed of light gauge metal, such as 14-22 gauge metal. In one embodiment, the first panel member 16 is stamped from 20 gauge galvanized steel, although other thicknesses and other suitable materials are within the scope of the present invention.

The metal blank 46 includes only two bends on each side of the blank to form the side portions 32, 34 and mounting flanges 42, 44 of the first panel member 16. Similarly, only two bends are required at the top and bottom to form the top portion 38 and mounting flange 38, and bottom portion 30 and mounting flange 40 of the first panel member 16. This configuration makes the first panel member 16 easier to form in a brake press and increases the accuracy of the bends as compared to panel members requiring more than two bends (e.g., three bends) on each side of the panel member.

Figure 10:
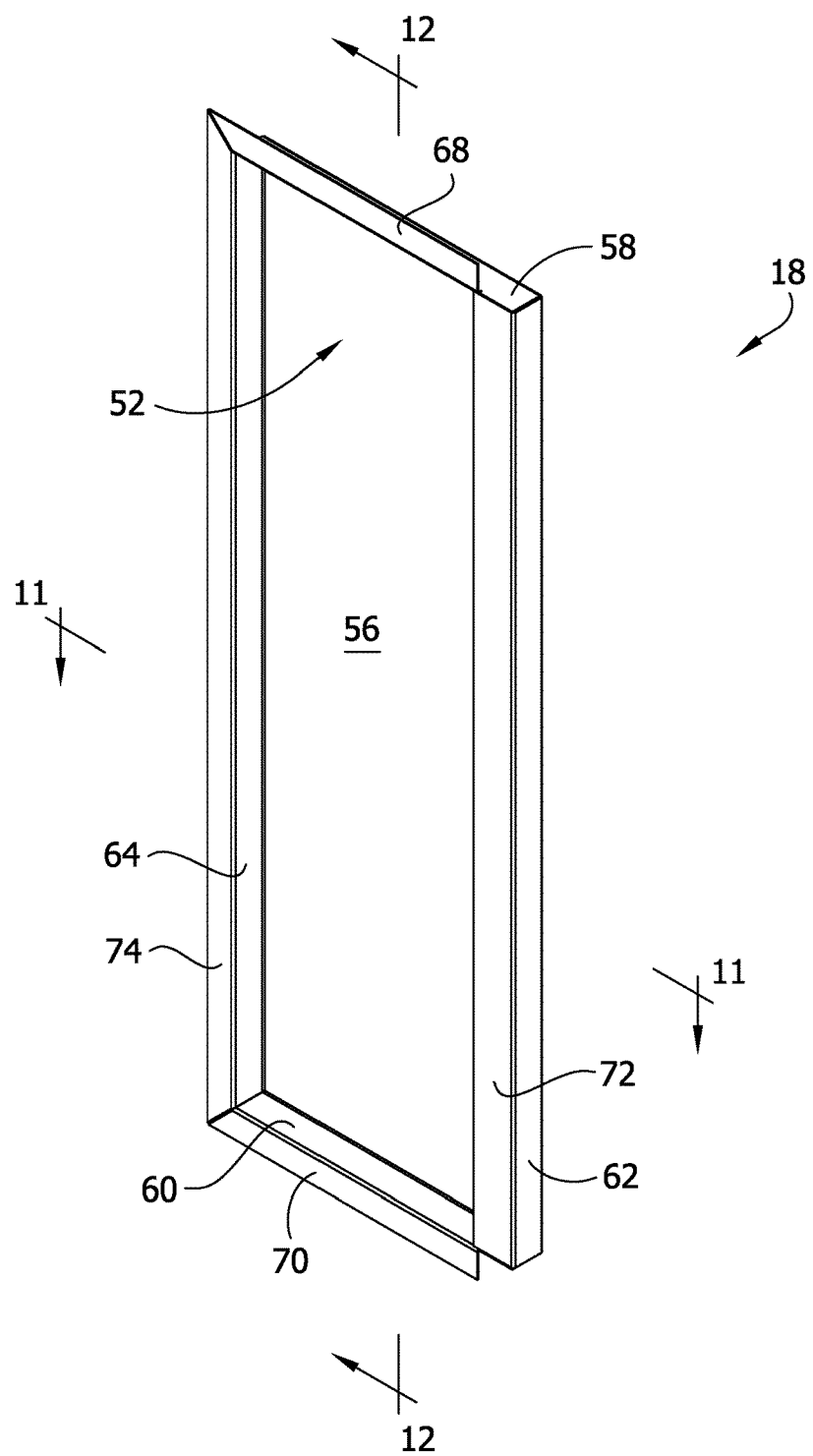
FIG. 10 is a perspective of a second panel member of the insulated panel assembly of FIG. 5.
Figure 11:
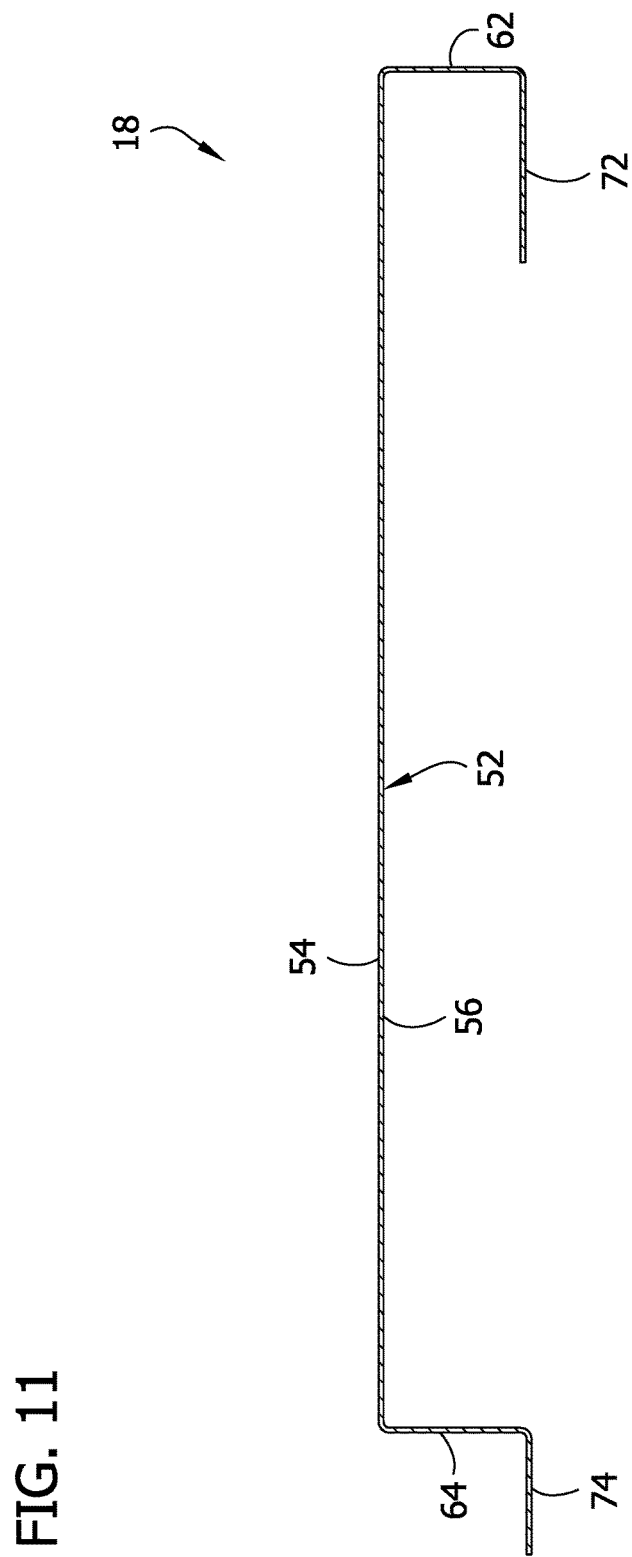
FIG. 11 is a section taken along line 11-11 of FIG. 10.
Figure 12:
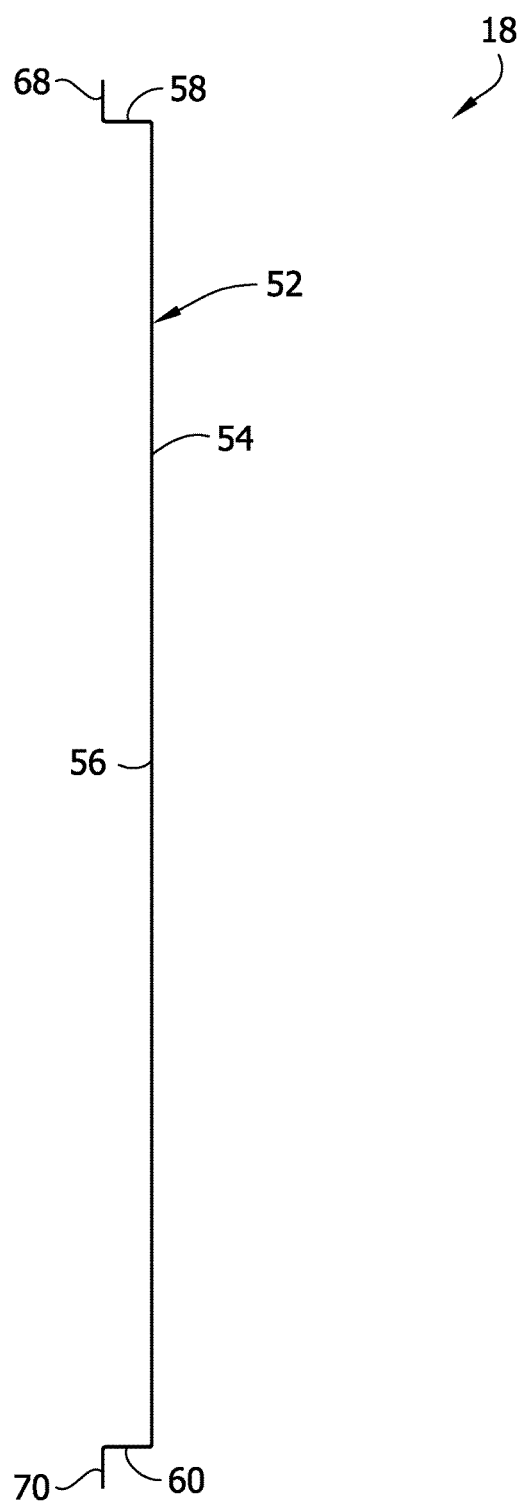
FIG. 12 is a section taken along line 12-12 of FIG. 10.

Referring to FIGS. 10-12, the second panel member 18 includes a base portion 52 having an outer face 54 and an inner face 56. A top portion 58 extends from a top edge margin of the base portion 52. The top portion 58 extends generally perpendicular from the base portion 52 in a direction inward away from the inner face 56. A bottom portion 60 extends from a bottom edge margin of the base portion 52 opposite the top portion 58. The bottom portion 60 extends generally perpendicular from the base portion 52 in a direction inward away from the inner face 56, such that the bottom portion and the top portion 58 are generally in spaced parallel alignment. A first side portion 62 extends from a first side edge margin of the base portion 52. The first side portion 62 extends generally perpendicular from the base portion 52 in a direction inward away from the inner face 56. A second side portion 64 extends from a second side edge margin of the base portion 52 opposite the first side portion 62. The second side portion 64 extends generally perpendicular from the base portion 52 in a direction inward away from the inner face 56, such that the first and second side portions are generally in spaced parallel alignment.

Referring still to FIGS. 10-12, each of the top, bottom, and first and second side portions 58, 60, 62, 64 of the second panel member 18 includes a mounting flange configured for attachment to the first panel member 16. A top mounting flange 68 extends generally perpendicular from the top portion 58 in a direction away from the bottom portion 60. A bottom mounting flange 70 extends generally perpendicular from the bottom portion 60 in a direction away from the top portion 58. A first side mounting flange 72 extends generally perpendicular from the first side portion 62 in a direction toward the second side portion 64. A second side mounting flange 74 extends generally perpendicular from the second side portion 64 in a direction away from the first side portion 62. The mounting flanges 68, 70, 72, 74 of the second panel member 18 preferably lie in the same plane for level attachment to the first panel member 16.

Figure 13:
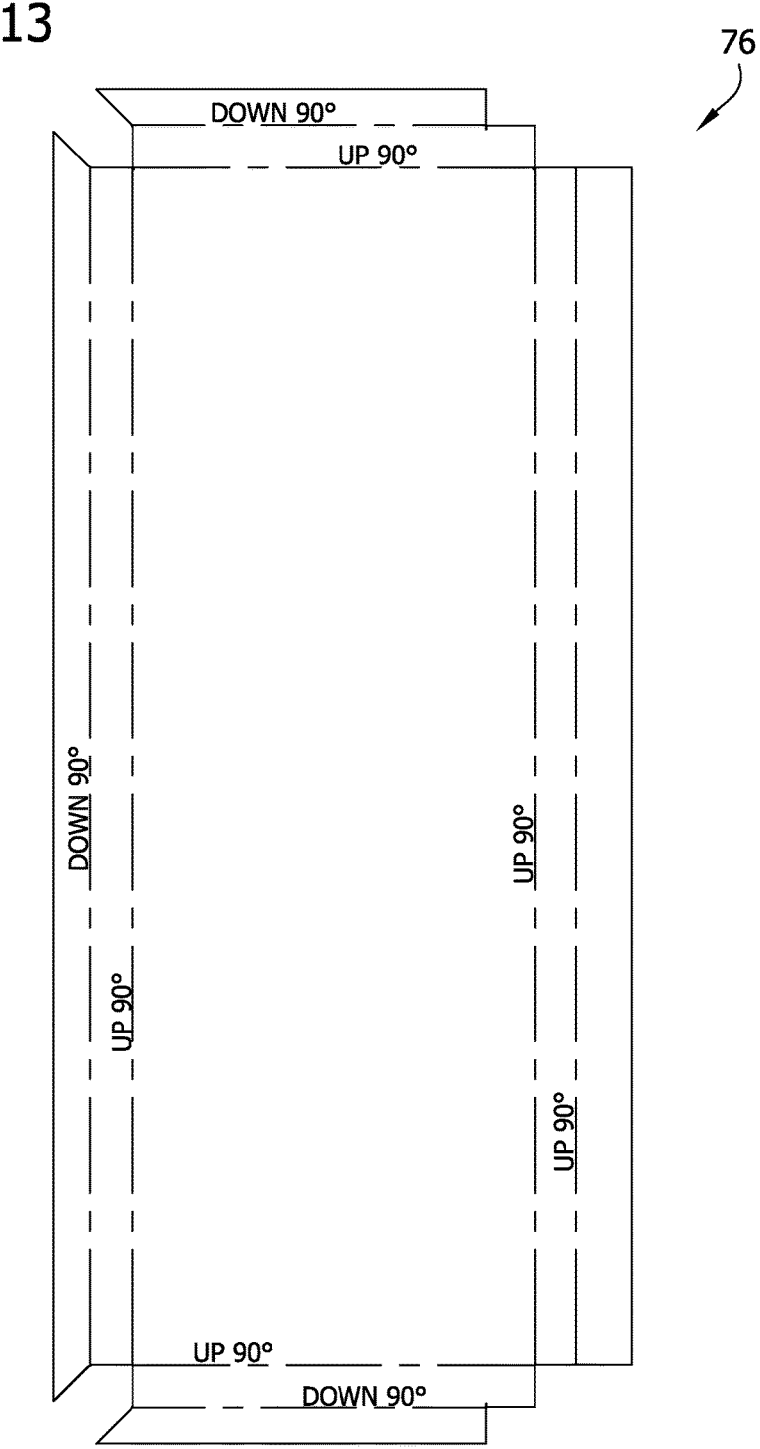
FIG. 13 is a top view of a stamped metal blank for forming a second panel member of an insulated panel assembly according to a first embodiment of the present invention.

As seen in FIG. 13, the second panel member 18 can be formed as one piece from a metal blank 76 that is stamped from a sheet metal roll and bent into shape. The second panel member 18 can be stamped from galvanized steel, stainless steel, aluminum, or any other suitable material. The second panel member 18 is preferably formed of light gauge material, such as 14-22 gauge material. In one embodiment, the second panel member 18 is stamped from 18 gauge galvanized steel, although other thicknesses and other suitable materials are within the scope of the present invention. The second panel member 18 and the first panel member 16 may be formed of the same material or different materials and may have the same thickness or different thicknesses.

The metal blank 76 includes only two bends on each side of the blank to form the second panel member 18. Similarly, only two bends are required at the top and bottom to form the top portion 58 and mounting flange 68, and bottom portion 60 and mounting flange 70 of the second panel member 18. This configuration makes the second panel member 18 easier to form in a brake press and increases the accuracy of the bends as compared to panel members requiring more than two bends (e.g., three bends) on each side of the panel member.

To form the insulated panel assembly 12, the first and second panel members 16, 18 are attached to each other. In order to maintain thermal efficiency, preferably there is no metal-to-metal contact between the first and second panel members 16, 18. In the illustrated embodiment, the first and second panel members 16, 18 are attached with double-sided adhesive strip 80 (see, FIGS. 14 and 15). The double-sided adhesive strip 80 is adhered to the mounting flanges to attach the first and second panel members 16, 18. The double-sided adhesive strip 80 attaches the mounting flanges 38, 40, 42, 44 of the first panel member 16 to the respective mounting flanges 68, 70, 72, 74 of the second panel member 18. The double-sided adhesive strip 80 also acts as a thermal break between the first and second panel members 16, 18. In one embodiment, the double-sided adhesive strip 80 is heavy duty double-sided foam tape. Preferably, the double-sided adhesive strip 80 has a width that is at least as large as a width of the first panel member mounting flanges 38, 40, 42, 44 to ensure that no portion of the first panel member 16 contacts the second panel member mounting flanges 68, 70, 72, 74 directly. As illustrated, the strip 80 is wider than the mounting flanges 38, 40, 42, 44. In one embodiment, the heavy duty double-sided foam tape has a width equal to a width of the first panel member mounting flanges 38, 40, 42, 44. For example, in one embodiment, both the first panel member mounting flanges and the double-sided adhesive strip have a width of about ½ inch. The double-sided adhesive strip 80 has a thickness configured to create a thermal break between the first and second panel members 16, 18. In one embodiment, the double-sided adhesive strip has a thickness of at least about ⅛ inch. For example, the double-sided adhesive strip can be ½ inch wide and ⅛ inch thick. One example of a suitable double-sided adhesive strip is the Double Coated Urethane Foam Tape 4008 sold by 3M. Other suitable double-sided adhesive strips are within the scope of the present invention.

Figure 14:
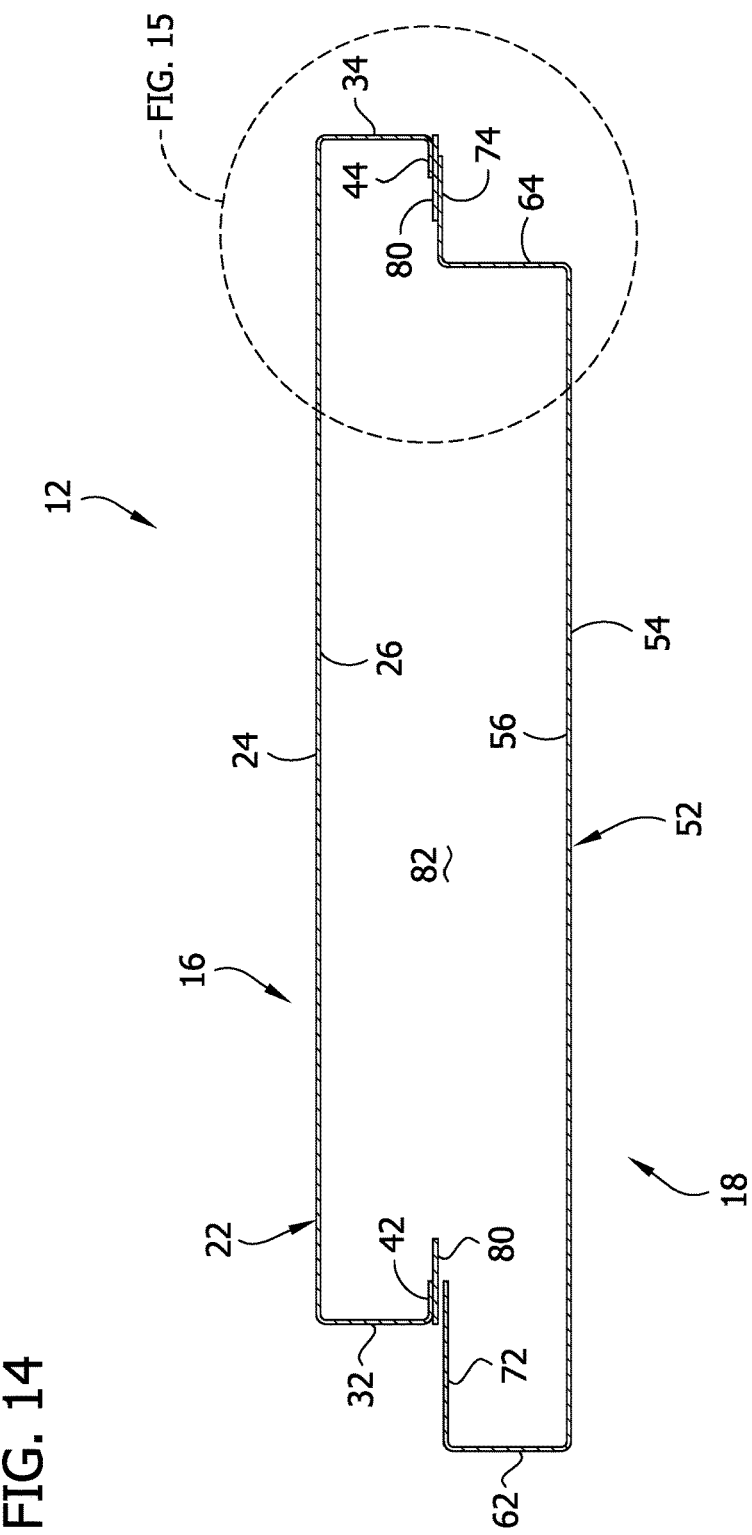
FIG. 14 is a section taken along line 14-14 of FIG. 5, illustrating the connection of the first panel member and the second panel member of the insulated panel assembly.

Referring to FIGS. 14-17, the first and second panel members 16, 18 are attached together such that the inner face 26 of the first panel member 16 is spaced from and opposes the inner face 56 of the second panel member 18, forming a cavity 82 that holds the insulated core (not illustrated in FIGS. 14-17). At least one edge margin of the first panel member 16 extends beyond the corresponding edge margin of the second panel member 18. As seen in FIGS. 5 and 14-17, the top edge margin of the first panel member 16 extends beyond the top edge margin of the second panel member 18, the bottom edge margin of the first panel member extends beyond the bottom edge margin of the second panel member, and the second side edge margin of the first panel member extends beyond the second side edge margin of the second panel member. For example, it may be seen in FIG. 17 that the top portion 28 of the first panel member 16 is disposed laterally outward from the top portion 58 of the second panel member 18. In the illustrated embodiment, the top portion 28 is also located above of the top edge of the top mounting flange 68. Similarly, the bottom portion 30 of the first panel member 16 is disposed laterally outward from the bottom portion 60 of the second panel member 18. In the illustrated embodiment, the bottom portion 30 of the first panel member 16 is also located below the bottom mounting flange 70 of the second panel member 18. As shown in FIG. 14, the second side portion 34 of the first panel member 16 is disposed laterally outward from the second side portion 64 of the second panel member 18. In the illustrated embodiment, the second side portion 34 of the first panel member 16 is also located outward to the right of the edge of the second side mounting flange 74 of the second panel member 18. The second panel member 18 is offset from the first panel member 16 such that the first side edge margin of the second panel member extends beyond the first side edge margin of the first panel member. For example as may be seen in FIG. 14, the first side portion 62 of the second panel member 18 is disposed laterally outward from the first side portion 32 of the first panel member 16. In the illustrated embodiment, the first side portion 62 of the second panel member 18 is also located to the left of both the first side portion 32 and the mounting flange 42 of the first panel member 16.

Figure 15:
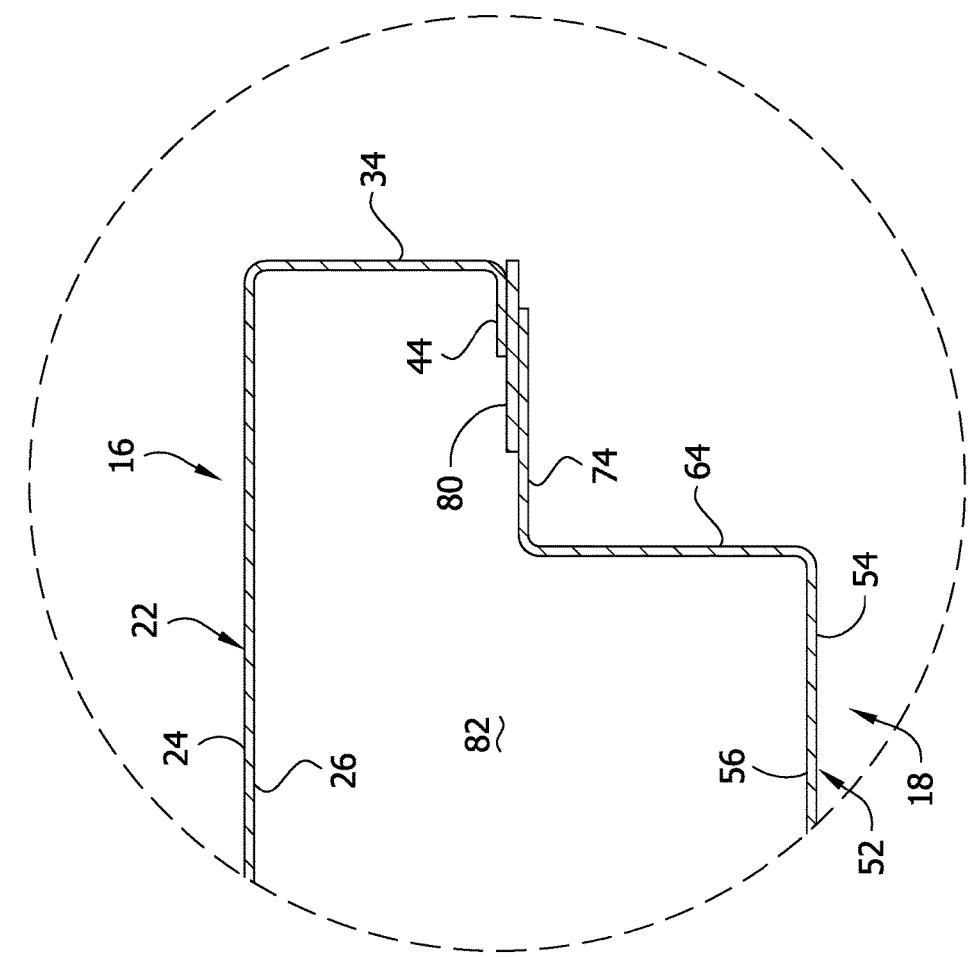
FIG. 15 is an enlarged fragmentary portion of FIG. 14.
Figure 16:
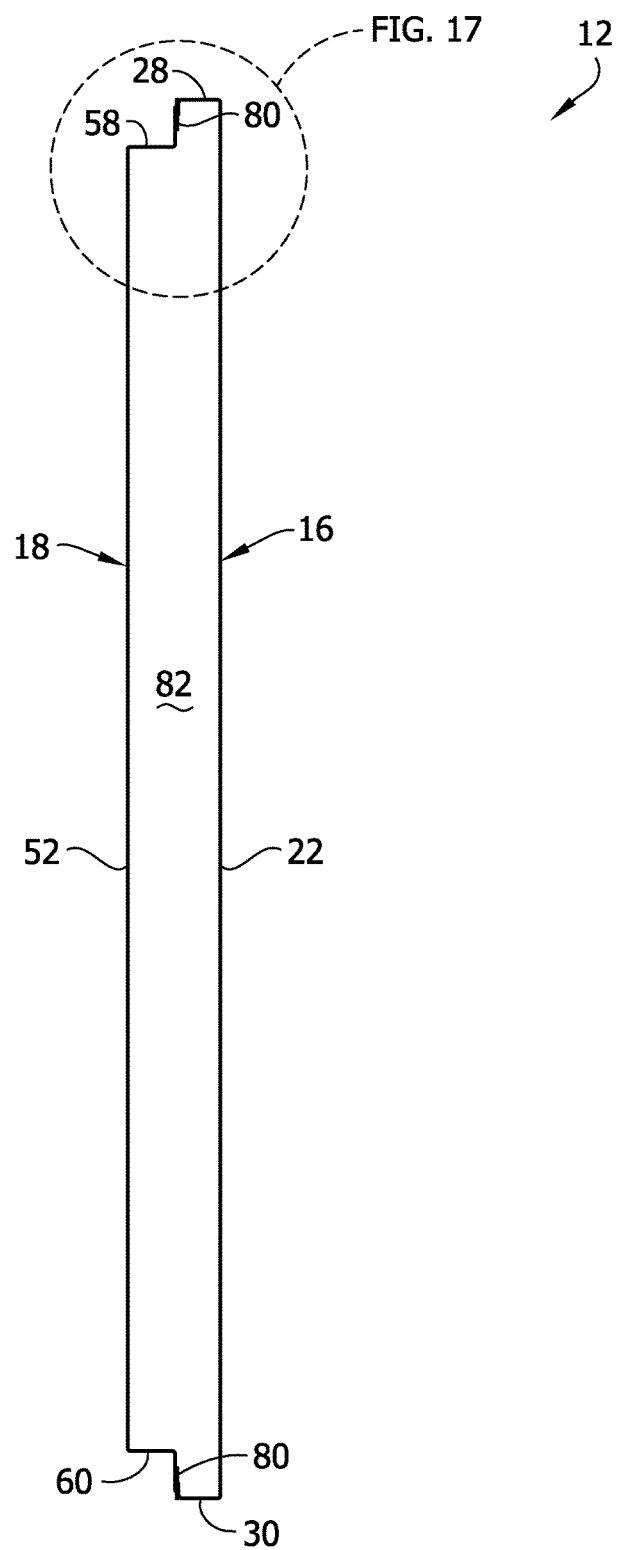
FIG. 16 is a section taken along line 16-16 of FIG. 5, illustrating the connection of the first panel member and the second panel member of the insulated panel assembly.
Figure 17:
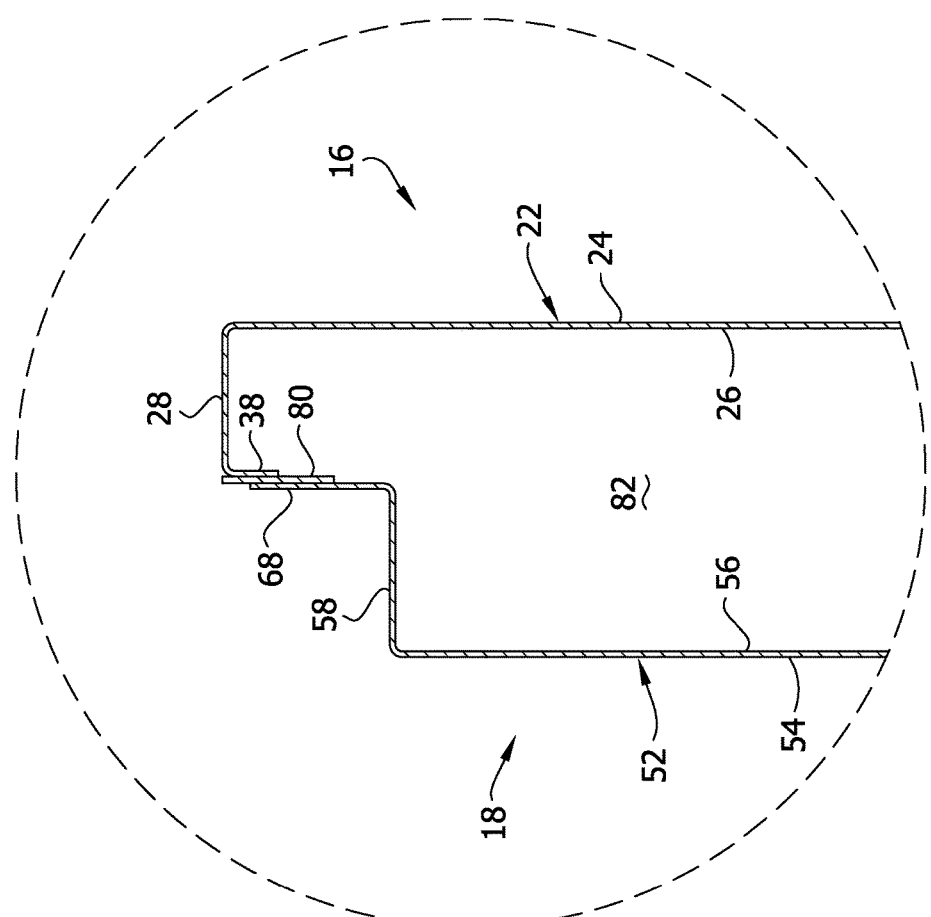
FIG. 17 is an enlarged fragmentary portion of FIG. 16.

The first and second panel members 16, 18 are positioned such that the mounting flanges of the first panel member are generally parallel to and in opposed facing relation to the mounting flanges of the second panel member. The top mounting flange 38 of the first panel member 16 is attached to the top mounting flange 68 of the second panel member 18 with double-sided adhesive strip 80 (FIGS. 16 and 17). The bottom mounting flange 40 of the first panel member 16 is attached to the bottom mounting flange 70 of the second panel member 18 with double-sided adhesive strip 80 (FIG. 16). The first side mounting flange 42 of the first panel member 16 is attached to the first side mounting flange 72 of the second panel member 18 with double-sided adhesive strip 80 (FIG. 14). The first side mounting flange 72 of the second panel member 18 extends laterally outward beyond the first side portion 32 of the first panel member 16. The second side mounting flange 44 of the first panel member 16 is attached to the second side mounting flange 74 of the second panel member 18 with double-sided adhesive strip 80 (FIGS. 14 and 15). The second side mounting flange 74 of the second panel member 18 does not extend beyond the second side portion 34 of the first panel member 16.

Attaching the first panel member 16 to the second panel member 18 with double-sided adhesive strip 80 reduces the time required to assemble the insulated panel assembly 12. In previous panel assemblies, the first and second panel members were attached by plastic clips to create a thermal break. However, the process of attaching the clips to the first and second panel member was very time consuming and labor-intensive. Forming the panel members as described above and using the double-sided adhesive strip to attach the panel members can reduce the time to assemble the panels by about 85% (e.g., from about 35 minutes to about 5 minutes).

The thermal insulating core 20 is positioned in the cavity 82 between the inner faces 26, 56 of the first and second panel members 16, 18. In one embodiment, after the first and second panel members 16, 18 are attached together, foam insulation is injected into the cavity 82 to form the thermal insulating core 20. For example, in one embodiment, the assembled first and second panel members 16, 18 are placed in a heated press and the cavity 82 is injected with urethane foam to form the core 20 having a density of about 2.5 lbs/ft$^3$ (40.05 kg/m$^3$). The thermal insulating core 20 can comprise other suitable insulating materials or other suitable densities within the scope of the present invention.

Figure 18:
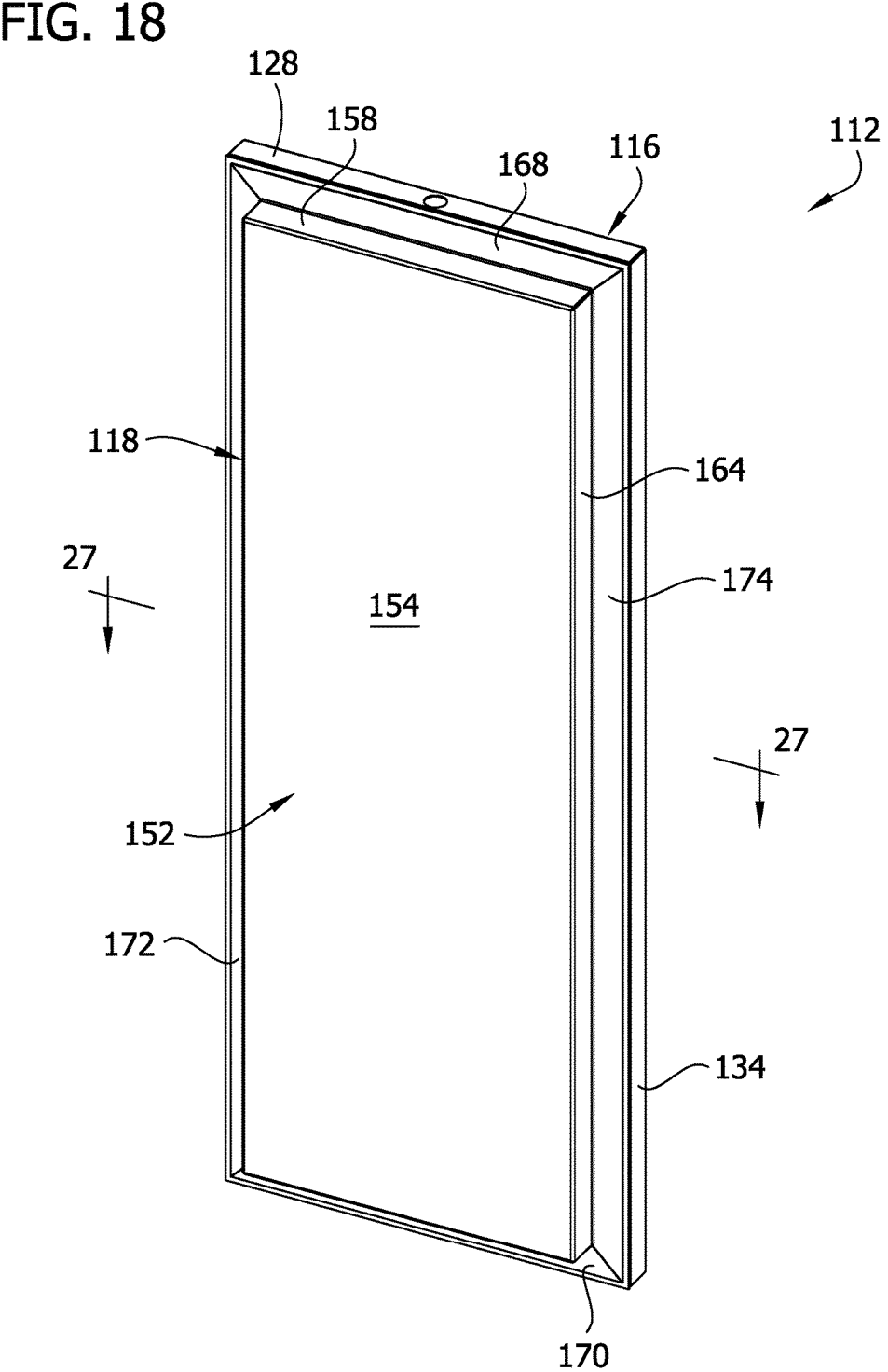
FIG. 18 is a perspective of an insulated panel assembly according to a second embodiment of the present invention.
Figure 19:
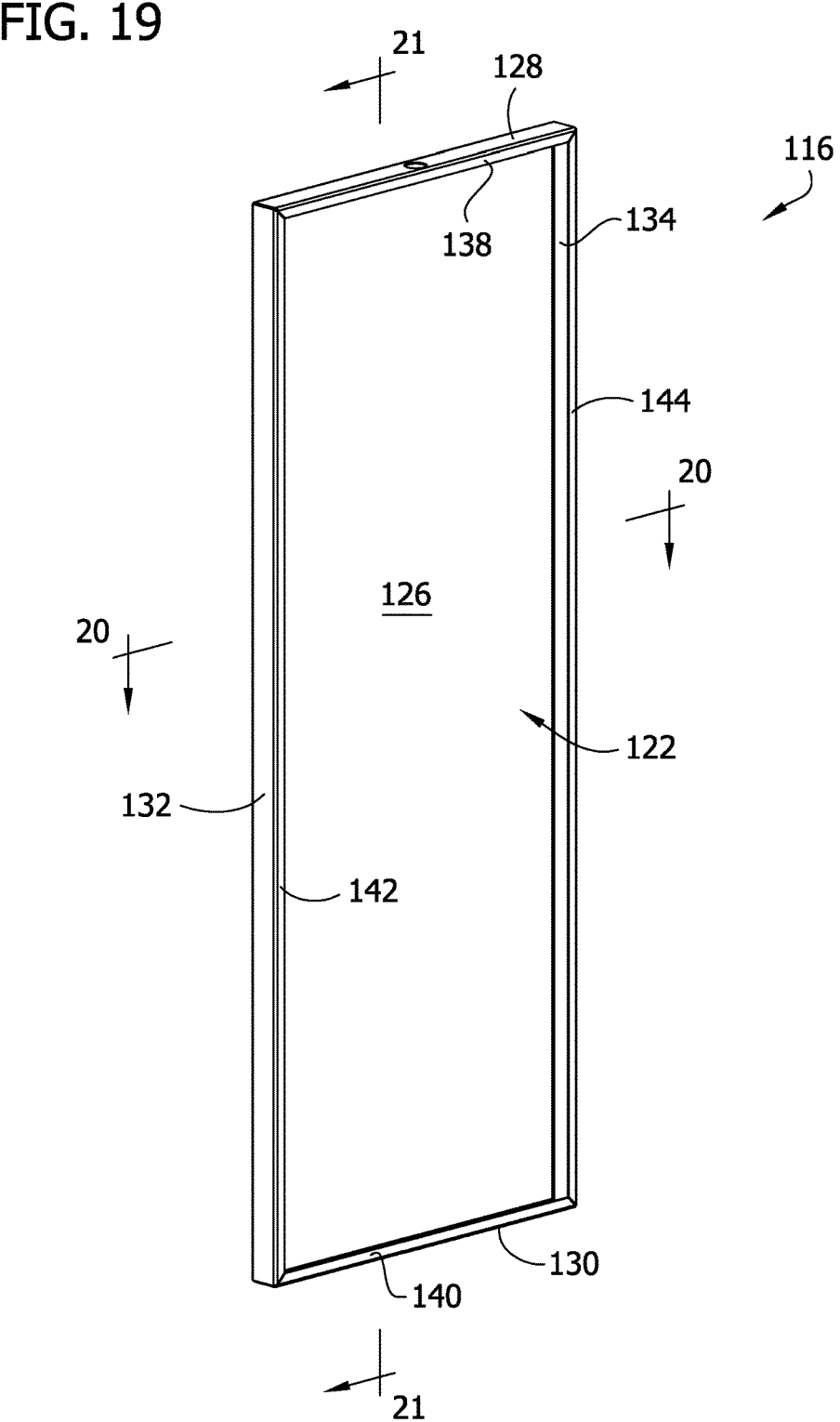
FIG. 19 is a perspective of a first panel member of the insulated panel assembly of FIG. 18.
Figure 20:
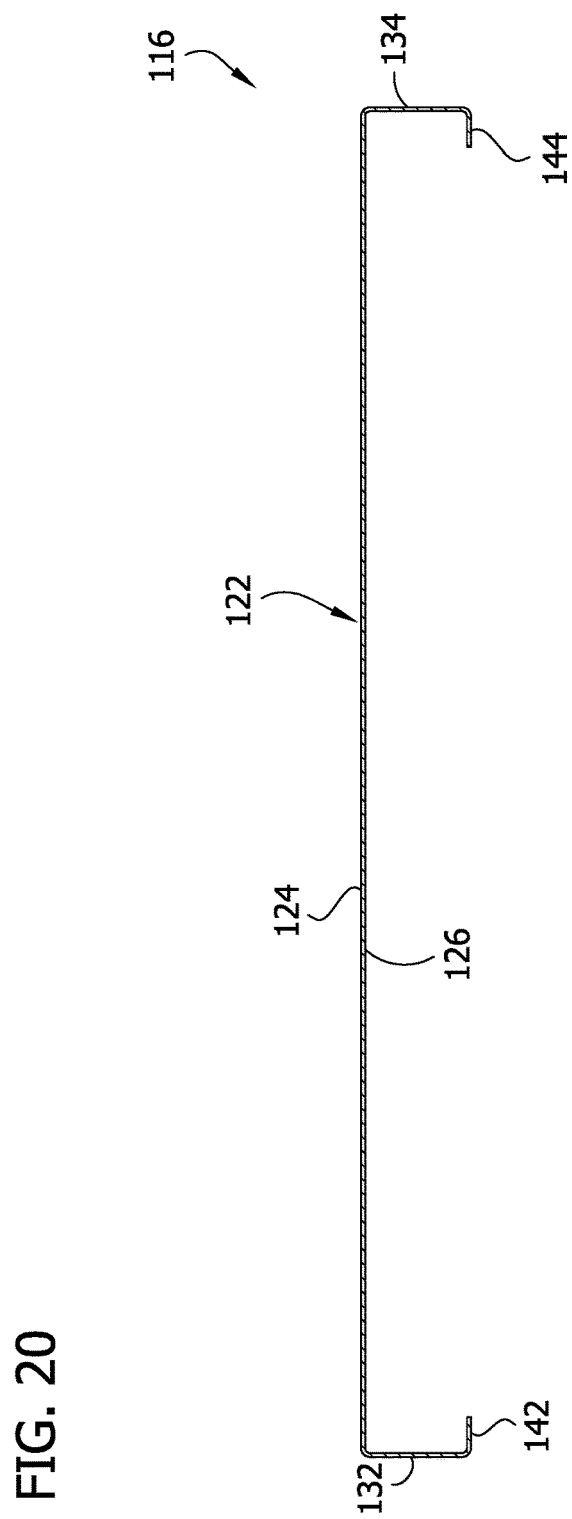
FIG. 20 is a section taken along line 20-20 of FIG. 19.
Figure 21:
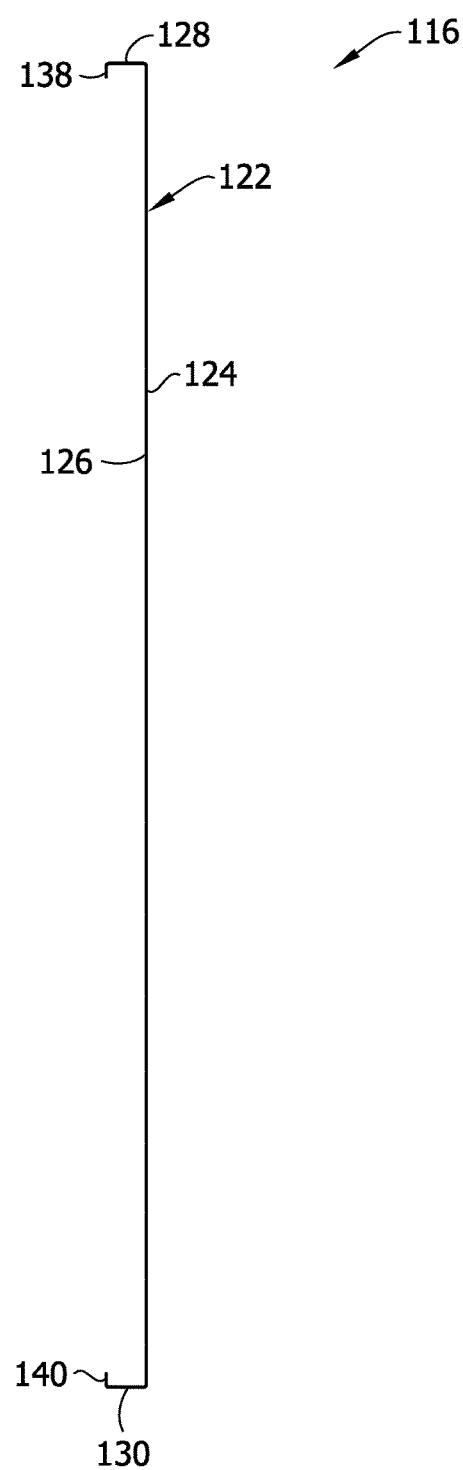
FIG. 21 is a section taken along line 21-21 of FIG. 19.

Referring to FIGS. 18-28, a second embodiment of the insulated panel assembly is indicated at 112. As seen in FIG. 18, each panel assembly 112 includes a first panel member 116, a second panel member 118, and a thermal insulating core (not shown, but corresponding to thermal insulating core 20 shown in FIG. 3). Referring now more specifically to FIGS. 19-21, the first panel member 116 is substantially similar to the first panel member 16 as described above. The first panel member 116 includes a base portion 122 having an outer face 124 and an inner face 126. A top portion 128 extends from a top edge margin of the base portion 122. The top portion 128 extends generally perpendicular from the base portion 122 in a direction inward away from the inner face 126. A bottom portion 130 extends from a bottom edge margin of the base portion 122 opposite the top portion 128. The bottom portion 130 extends generally perpendicular from the base portion 122 in a direction inward away from the inner face 126, such that the bottom portion and the top portion are generally in spaced parallel alignment. A first side portion 132 extends from a first side edge margin of the base portion 122. The first side portion 132 extends generally perpendicular from the base portion 122 in a direction inward away from the inner face 126. A second side portion 134 extends from a second side edge margin of the base portion 122 opposite the first side portion 132. The second side portion 134 extends generally perpendicular from the base portion 122 in a direction inward away from the inner face 126, such that the first and second side portions are generally in spaced parallel alignment.

Each of the top, bottom, and first and second side portions 128, 130, 132, 134 includes a mounting flange configured for attachment to the second panel member 118. A top mounting flange 138 extends generally perpendicular from the top portion 128 in a direction toward the bottom portion 130. A bottom mounting flange 140 extends generally perpendicular from the bottom portion 130 in a direction toward the top portion 128. A first side mounting flange 142 extends generally perpendicular from the first side portion 132 in a direction toward the second side portion 134. A second side mounting flange 144 extends generally perpendicular from the second side portion 134 in a direction toward the first side portion 132. The mounting flanges 138, 140, 142, 144 of the first panel member 116 preferably lie in the same plane for level attachment to the second panel member 118.

Figure 22:
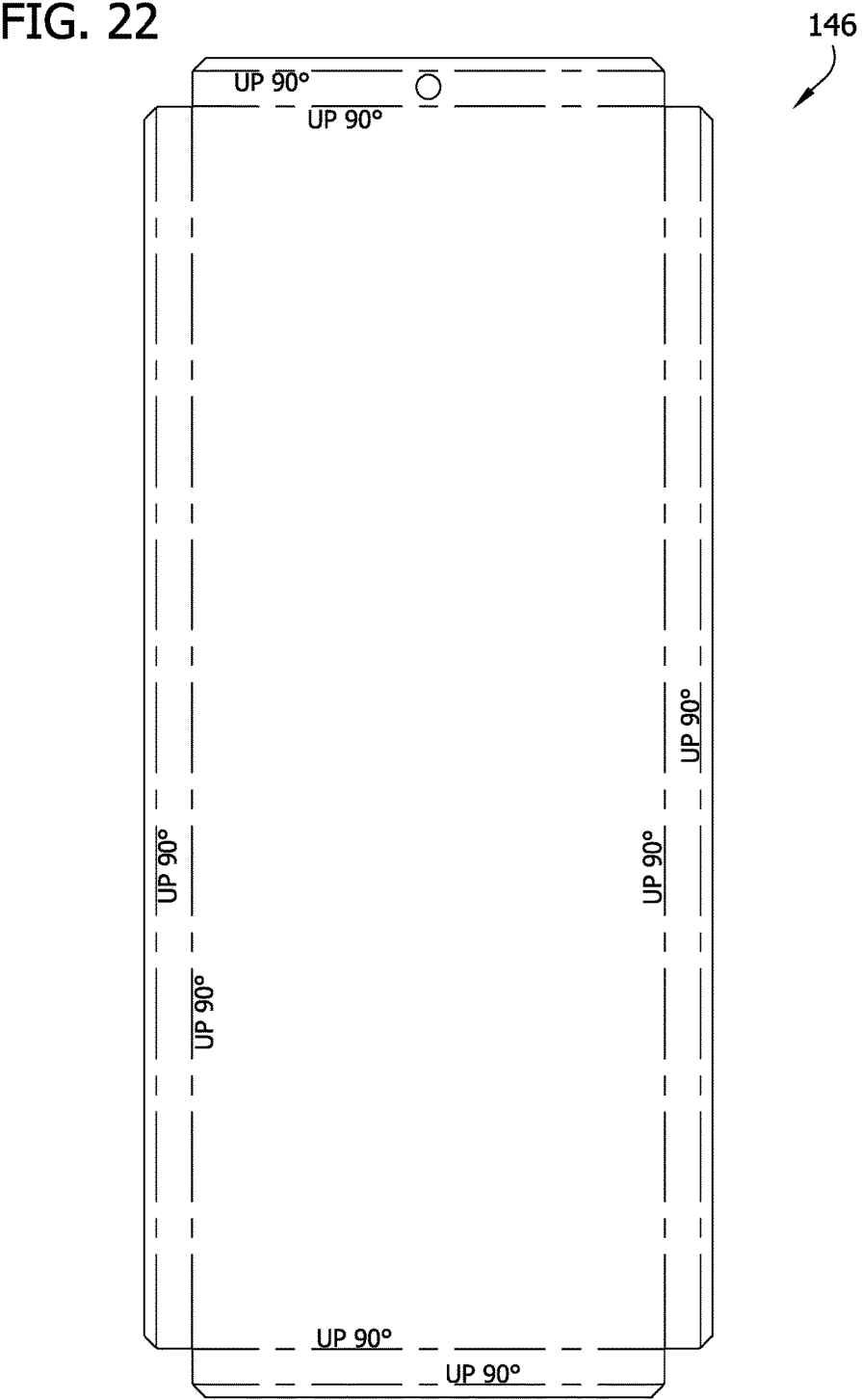
FIG. 22 is a top view of a stamped metal blank for forming a first panel member of an insulated panel assembly according to a second embodiment of the present invention.

As seen in FIG. 22, the first panel member 116 can be formed as one piece from a metal blank 146 that is stamped from a sheet metal roll and bent into shape. The first panel member 116 can be stamped from galvanized steel, stainless steel, aluminum, or any other suitable material. The first panel member 116 is preferably formed of light gauge metal, such as 14-22 gauge metal. In one embodiment, the first panel member 116 is stamped from 20 gauge galvanized steel, although other thicknesses and other suitable materials are within the scope of the present invention.

The metal blank 146 includes only two bends on each side of the blank and two bends at the top and bottom of the blank to form the first panel member 116. This configuration makes the first panel member 116 easier to form in a brake press and increases the accuracy of the bends as compared to panel members requiring more than two bends (e.g., three bends) on the top, bottom and each side of the panel member.

Figure 23:
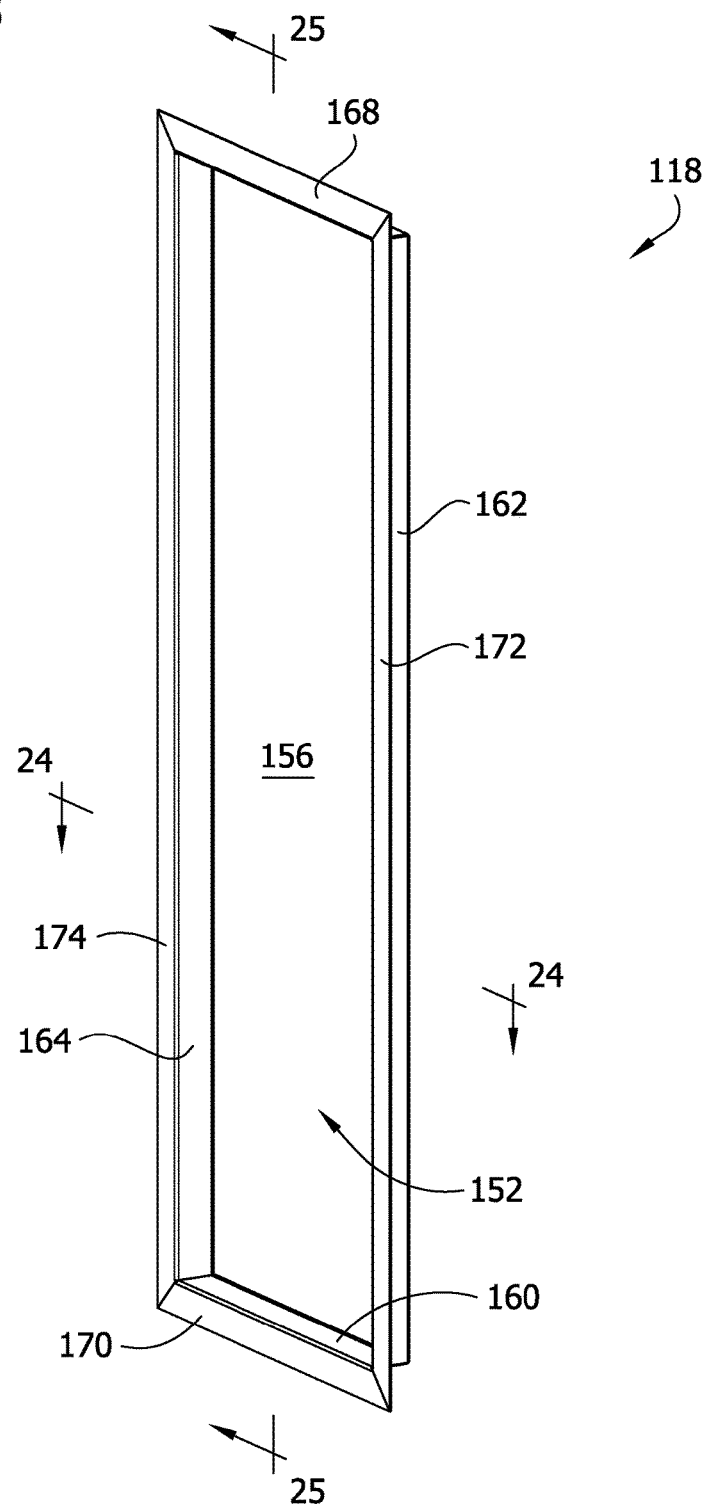
FIG. 23 is a perspective of a second panel member of the insulated panel assembly of FIG. 18.
Figure 24:
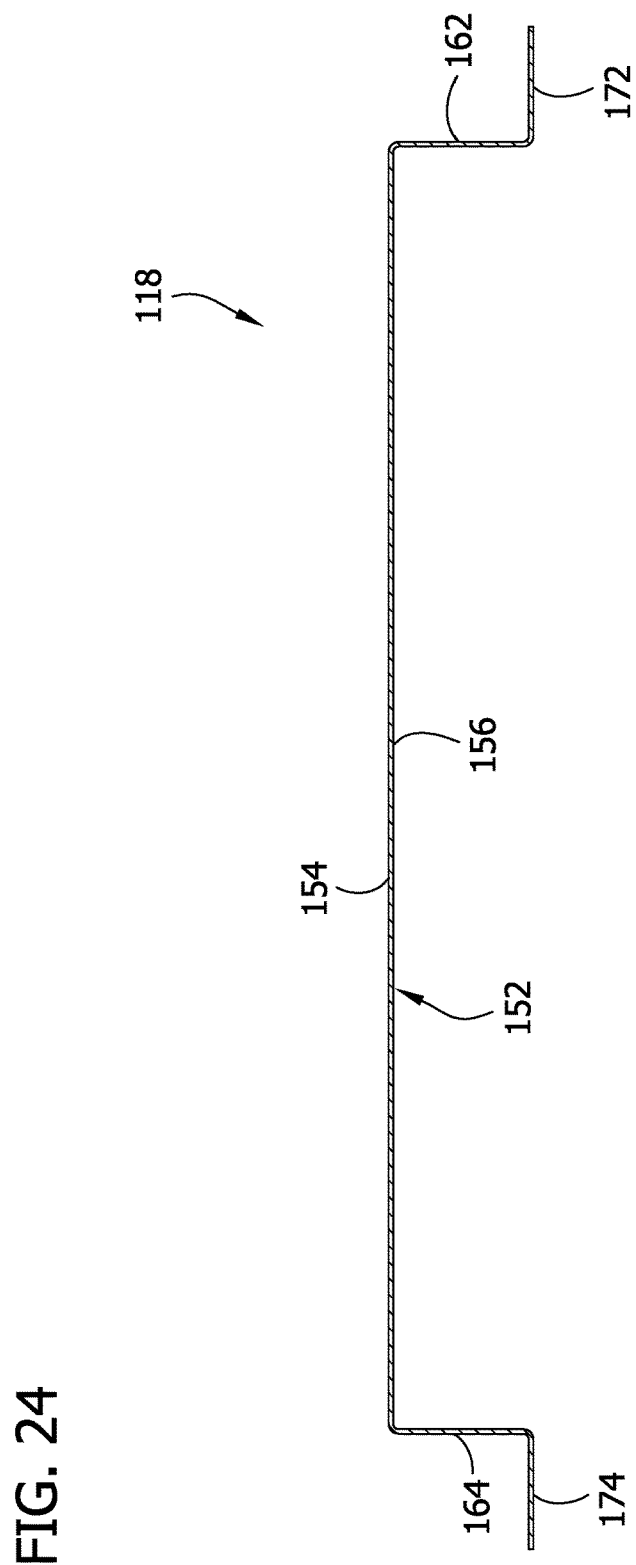
FIG. 24 is a section taken along line 24-24 of FIG. 23.
Figure 25:
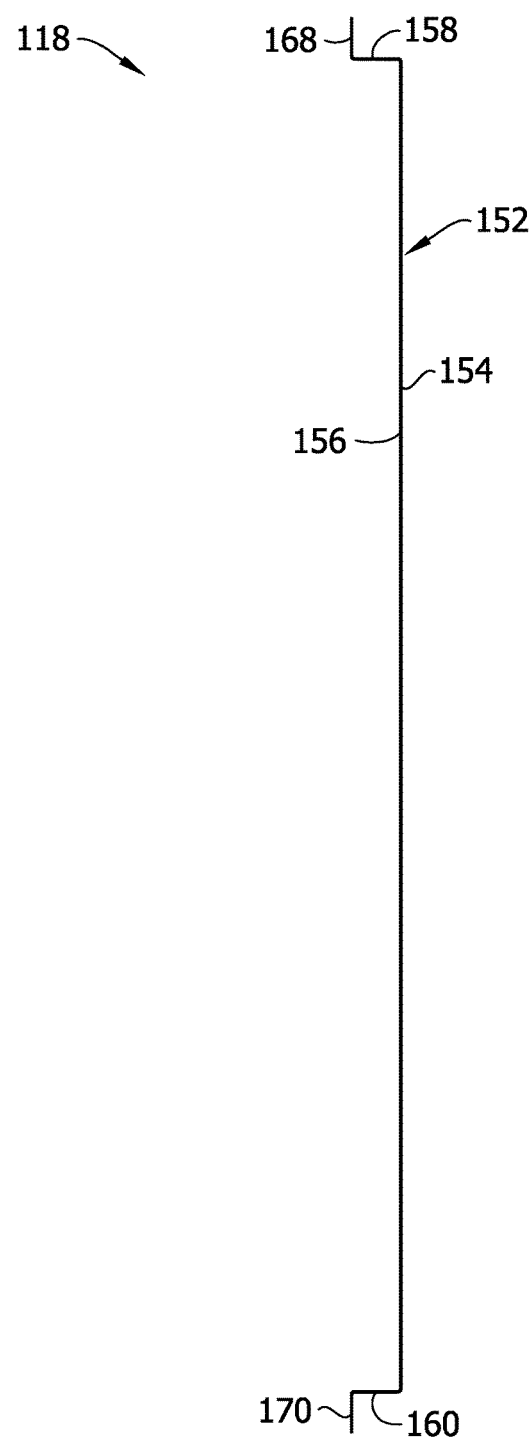
FIG. 25 is a section taken along line 25-25 of FIG. 23.

Referring to FIGS. 23-25, the second panel member 118 includes a base portion 152 having an outer face 154 and an inner face 156. A top portion 158 extends from a top edge margin of the base portion 152. The top portion 158 extends generally perpendicular from the base portion 152 in a direction inward away from the inner face 156. A bottom portion 160 extends from a bottom edge margin of the base portion 152 opposite the top portion 158. The bottom portion 160 extends generally perpendicular from the base portion 152 in a direction inward away from the inner face 156, such that the bottom portion and the top portion are generally in spaced parallel alignment. A first side portion 162 extends from a first side edge margin of the base portion 152. The first side portion 162 extends generally perpendicular from the base portion 152 in a direction inward away from the inner face 156. A second side portion 164 extends from a second side edge margin of the base portion 152 opposite the first side portion 162. The second side portion 164 extends generally perpendicular from the base portion 152 in a direction inward away from the inner face 156, such that the first and second side portions are generally in spaced parallel alignment.

Each of the top, bottom, and first and second side portions 158, 160, 162, 164 of the second panel member 118 includes a mounting flange configured for attachment to the first panel member 116. A top mounting flange 168 extends generally perpendicular from the top portion 158 in a direction away from the bottom portion 160. A bottom mounting flange 170 extends generally perpendicular from the bottom portion 160 in a direction away from the top portion 158. A first side mounting flange 172 extends generally perpendicular from the first side portion 162 in a direction away from second side portion 164. A second side mounting flange 174 extends generally perpendicular from the second side portion 164 in a direction away from the first side portion 162. The mounting flanges 168, 170, 172, 174 of the second panel member 118 preferably lie in the same plane for level attachment to the first panel member 116.

Figure 26:
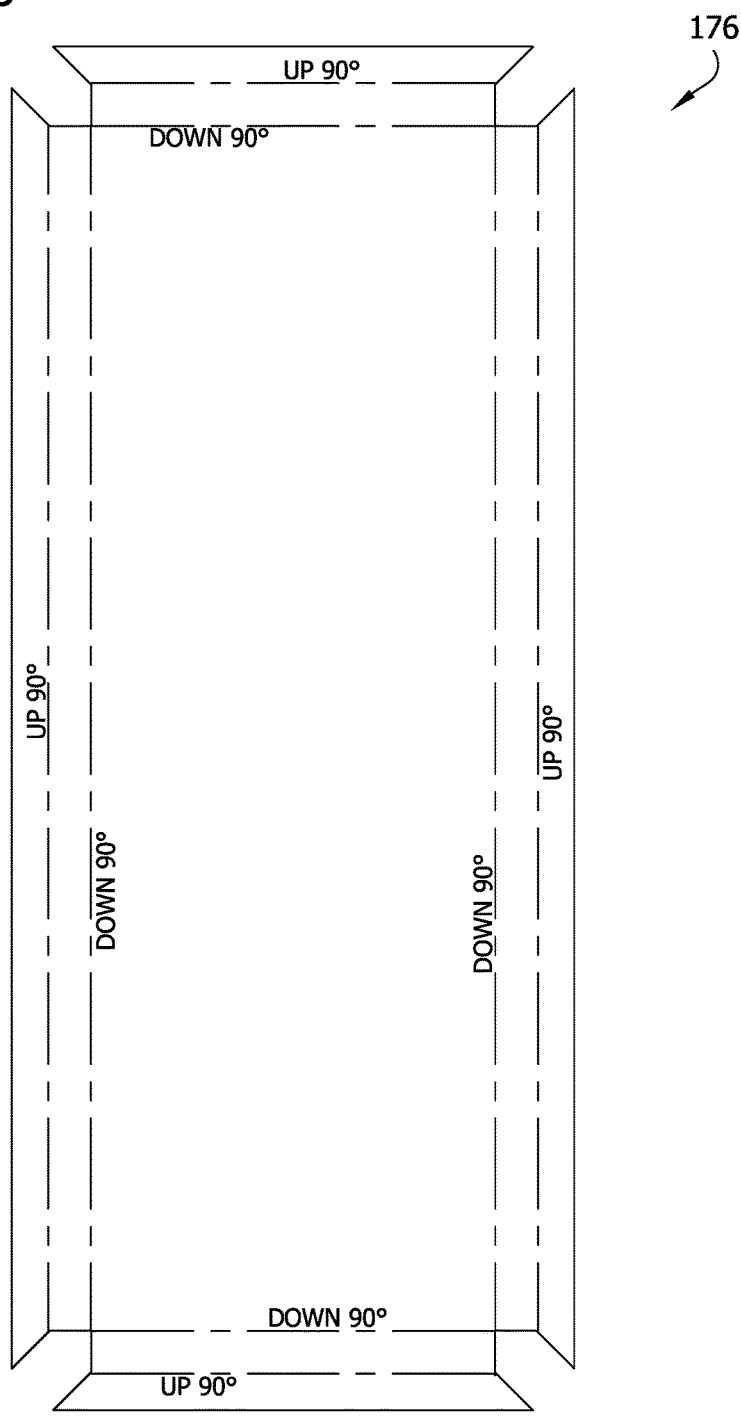
FIG. 26 is a top view of a stamped metal blank for forming a second panel member of an insulated panel assembly according to a second embodiment of the present invention.

As seen in FIG. 26, the second panel member 118 can be formed as one piece from a metal blank 176 that is stamped from a sheet metal roll and bent into shape. The second panel member 118 can be stamped from galvanized steel, stainless steel, aluminum, or any other suitable material. The second panel member 118 is preferably formed of light gauge material, such as 14-22 gauge material. In one embodiment, the second panel member 118 is stamped from 18 gauge galvanized steel, although other thicknesses and other suitable materials are within the scope of the present invention. The inner panel 118 and the outer panel 116 may be formed of the same material or different materials and may have the same thickness or different thicknesses.

The metal blank 176 includes only two bends on each side of the blank, and two bends at the top and bottom of the blank to form the second panel member 118. This configuration makes the second panel member 118 easier to form in a brake press and increases the accuracy of the bends as compared to panel members requiring more than two bends (e.g., three bends) on each side, top and bottom of the panel member.

Figure 27:
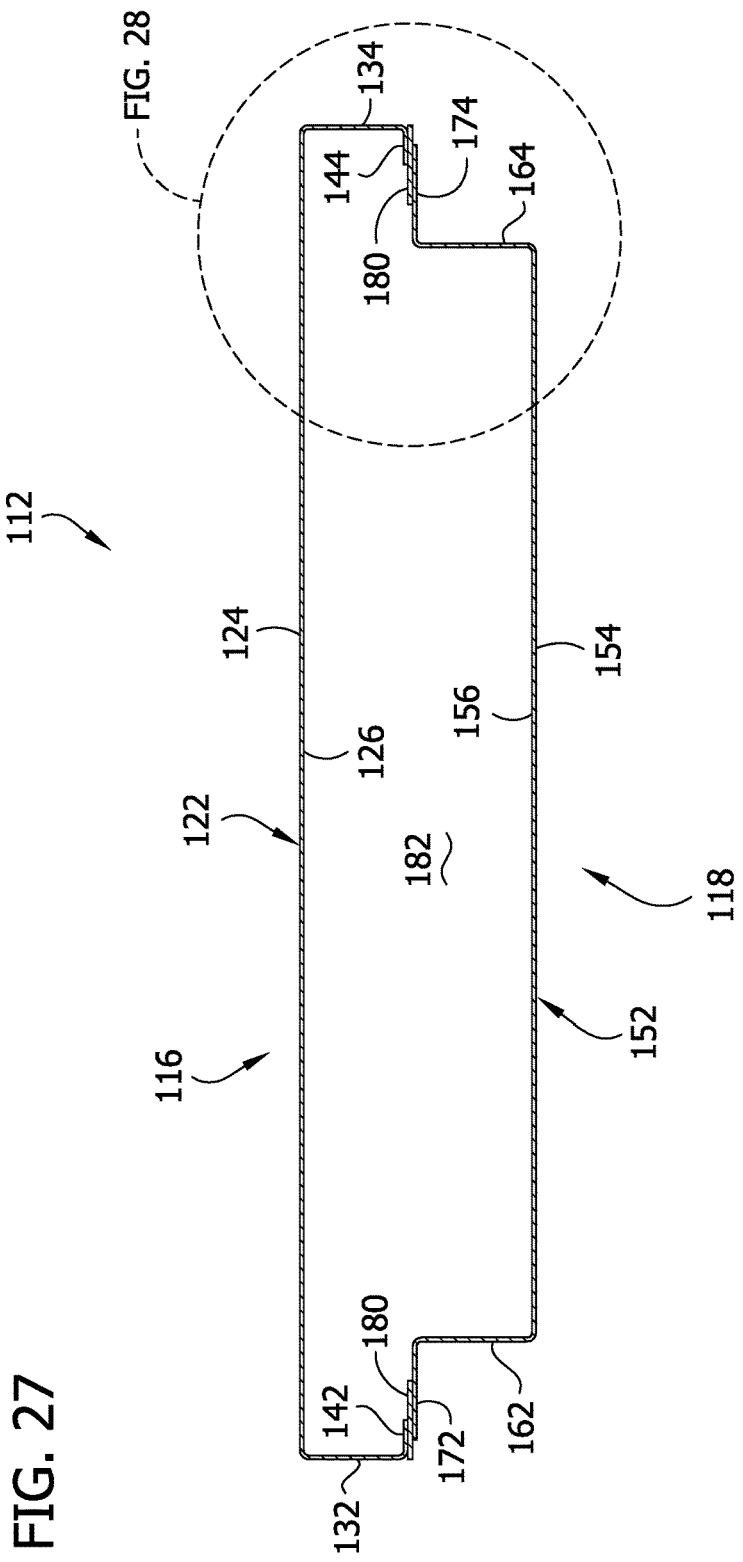
FIG. 27 is a section taken along line 27-27 of FIG. 18, illustrating the connection of the first panel member and the second panel member of the insulated panel assembly.
Figure 28:
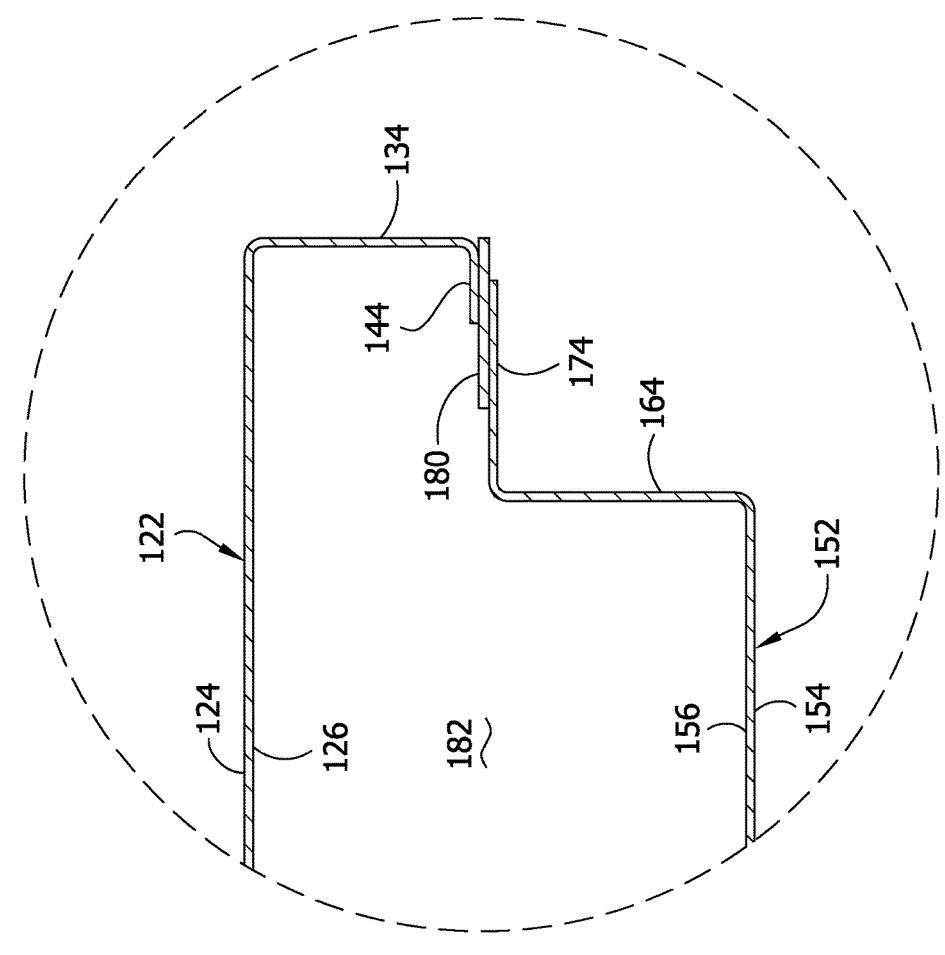
FIG. 28 is an enlarged fragmentary portion of FIG. 27.

To form the insulated panel assembly 112, the first and second panel members 116, 118 are attached to each other. In order to maintain thermal efficiency, preferably there is no metal-to-metal contact between the first and second panel members 116, 118. In the illustrated embodiment, the first and second panel members 116, 118 are attached with double-sided adhesive strip 180 (FIGS. 27 and 28). The double-sided adhesive strip 180 is adhered to the mounting flanges to attach the first and second panel members 116, 118. The double-sided adhesive strip 180 attaches the mounting flanges 138, 140, 142, 144 of the first panel member 116 to the respective mounting flanges 168, 170, 172, 174 of the second panel member 118. The double-sided adhesive strip 180 also acts as a thermal break between the first and second panel members 116, 118. In one embodiment, the double-sided adhesive strip 180 is heavy duty double-sided foam tape. Preferably, the double-sided adhesive strip 180 has a width that is at least as large as a width of the first panel member mounting flanges 138, 140, 142, 144 to ensure that no portion of the first panel member 116 contacts the second panel member mounting flanges 168, 170, 172, 174 directly. As illustrated, the strip 180 is wider than the mounting flanges 138, 140, 142, 144. In one embodiment, the heavy duty double-sided foam tape has a width equal to a width of the first panel member mounting flanges 138, 140, 142, 144. For example, in one embodiment, both the first panel member mounting flanges and the double-sided adhesive strip have a width of about ½ inch. The double-sided adhesive strip 180 has a thickness configured to create a thermal break between the first and second panel members 116, 118. In one embodiment, the double-sided adhesive strip has a thickness of at least about ⅛ inch. For example, the double-sided adhesive strip can be ½ inch wide and ⅛ inch thick. One example of a suitable double-sided adhesive strip is the Double Coated Urethane Foam Tape 4008 sold by 3M. Other suitable double-sided adhesive strips are within the scope of the present invention.

Referring to FIGS. 27 and 28, the first and second panel members 116, 118 are attached together such that the inner face 126 of the first panel member 116 is spaced from and opposes the inner face 156 of the second panel member 118, forming a cavity 182. At least one edge margin of the first panel member 116 extends beyond the corresponding edge margin of the second panel member 118. As seen in FIGS. 18, 27, and 28, the top portion 128 of the first panel member 116 is disposed laterally outward from the top portion 158 of the second panel member 118. In the illustrated embodiment, the top edge margin of the first panel member 116 extends beyond the top edge margin of the second panel member 118. The bottom portion 130 of the first panel member is disposed laterally outward from the bottom portion 160 of the second panel member. In the illustrated embodiment. In the illustrated embodiment, the bottom edge margin of the first panel member 116 extends beyond the bottom edge margin of the second panel member 118. The first side portion 132 of the first panel member 116 is disposed laterally outward from the first side portion 162 of the second panel member 118. In the illustrated embodiment, the first side edge margin of the first panel member 116 extends beyond the first side edge margin of the second panel member 118. The second side portion 134 of the first panel member 116 is disposed laterally outward from the second side portion 164 of the second panel member 118. In the illustrated embodiment, and the second side edge margin of the first panel member 116 extends beyond the second side edge margin of the second panel member 118. The second panel member 118 is substantially centered within the first panel member 116 such that the first panel member extends beyond the second panel member at all four edge margins.

The first and second panel members 116, 118 are positioned such that the mounting flanges of the first panel member are generally parallel to and in opposed facing relation to the mounting flanges of the second panel member. The top mounting flange 138 of the first panel member 116 is attached to the top mounting flange 168 of the second panel member 118 with double-sided adhesive strip 180. The bottom mounting flange 140 of the first panel member 116 is attached to the bottom mounting flange 170 of the second panel member 118 with double-sided adhesive strip 180. The first side mounting flange 142 of the first panel member 116 is attached to the first side mounting flange 172 of the second panel member 118 with double-sided adhesive strip 180 (FIG. 27). In this embodiment, the first side mounting flange 172 of the second panel member 118 does not extend beyond the first side portion 132 of the first panel member 116. The second side mounting flange 144 of the first panel member 116 is attached to the second side mounting flange 174 of the second panel member 118 with double-sided adhesive strip 180 (FIGS. 27 and 28). The second side mounting flange 174 of the second panel member 118 does not extend beyond the second side portion 134 of the first panel member 116.

Attaching the first panel member 116 to the second panel member 118 with double-sided adhesive strip 180 reduces the time required to assemble the insulated panel assembly 112. In previous panel assemblies, the first and second panel members were attached by plastic clips to create a thermal break. However, the process of attaching the clips to the first and second panel members was very time consuming and labor-intensive. Forming the panel members as described above and using the double-sided adhesive strip to attach the panel members can reduce the time to assemble the panels by about 85% (e.g., from about 35 minutes to about 5 minutes).

The thermal insulating core 120 (FIG. 3) is positioned in the cavity 182 between the inner faces 126, 156 of the first and second panel members 116, 118. In one embodiment, after the first and second panel members 116, 118 are attached together, foam insulation is injected into the cavity 182 to form the thermal insulating core 120. For example, in one embodiment, the assembled first and second panel members 116, 118 are placed in the heated press and the cavity 182 is injected with urethane foam to form the core 120 having a density of about 2.5 lbs/ft$^3$ (40.05 kg/m$^3$). The thermal insulating core can comprise other suitable insulating materials or other suitable densities within the scope of the present invention.

In order to ensure the first panel members 16, 116 and second panel members 18, 118 are properly aligned for attachment with double-sided adhesive strip 80, 180, one or more corner jigs 86a, 86b, 186a, 186b may be used (FIGS. 29-35). The corner jigs 86a, 86b, 186a, 186b can remain on the panel assemblies 12, 112 during the foam injection to maintain the panel members in position and act as a stop for plates of the heated press.

Figure 29:
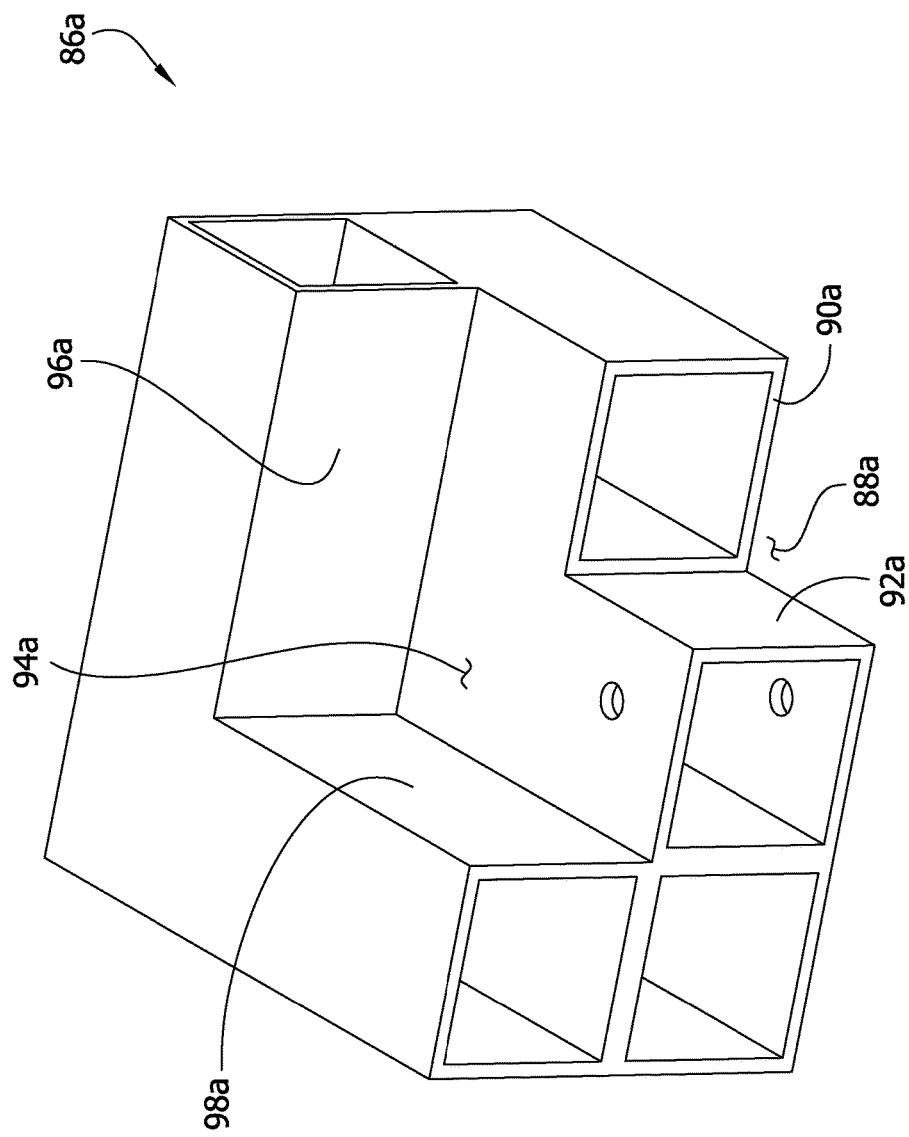
FIG. 29 is a perspective of a first corner jig.

Referring to FIG. 29, a first corner jig 86a is shown. The first corner jig 86a is configured for use (by itself or in conjunction with the other corner jigs 86b, 186a, 186b) in positioning the second side portion 34 of the first panel member 16 and the second side portion 64 of the second panel member 18 such that the side portion 34 of the first panel member is disposed laterally outward from the side portion 64 of the second panel member. The first corner jig 86a includes a first recess 88a defined by an end wall 90a and a side wall 92*a*. The first recess 88*a* is configured to receive the second panel member 18 such that the top portion 58 engages the end wall 90*a* and the second side portion 64 engages the side wall 92*a*. The first corner jig 86*a* further includes a second recess 94*a* positioned above the first recess 88*a* and defined by an end wall 96*a* and a side wall 98*a*. The side wall 92*a* is further from a side edge margin of the first corner jig 86*a* than the side wall 92*a*. The end wall 96*a* is closer to an end edge margin of the corner jig 86*a* than the end wall 90*a*. The second recess 94*a* is configured to receive the first panel member 16 such that the top portion 28 engages the end wall 96*a* and the first side portion 32 engages the side wall 98*a*.

Figure 30:
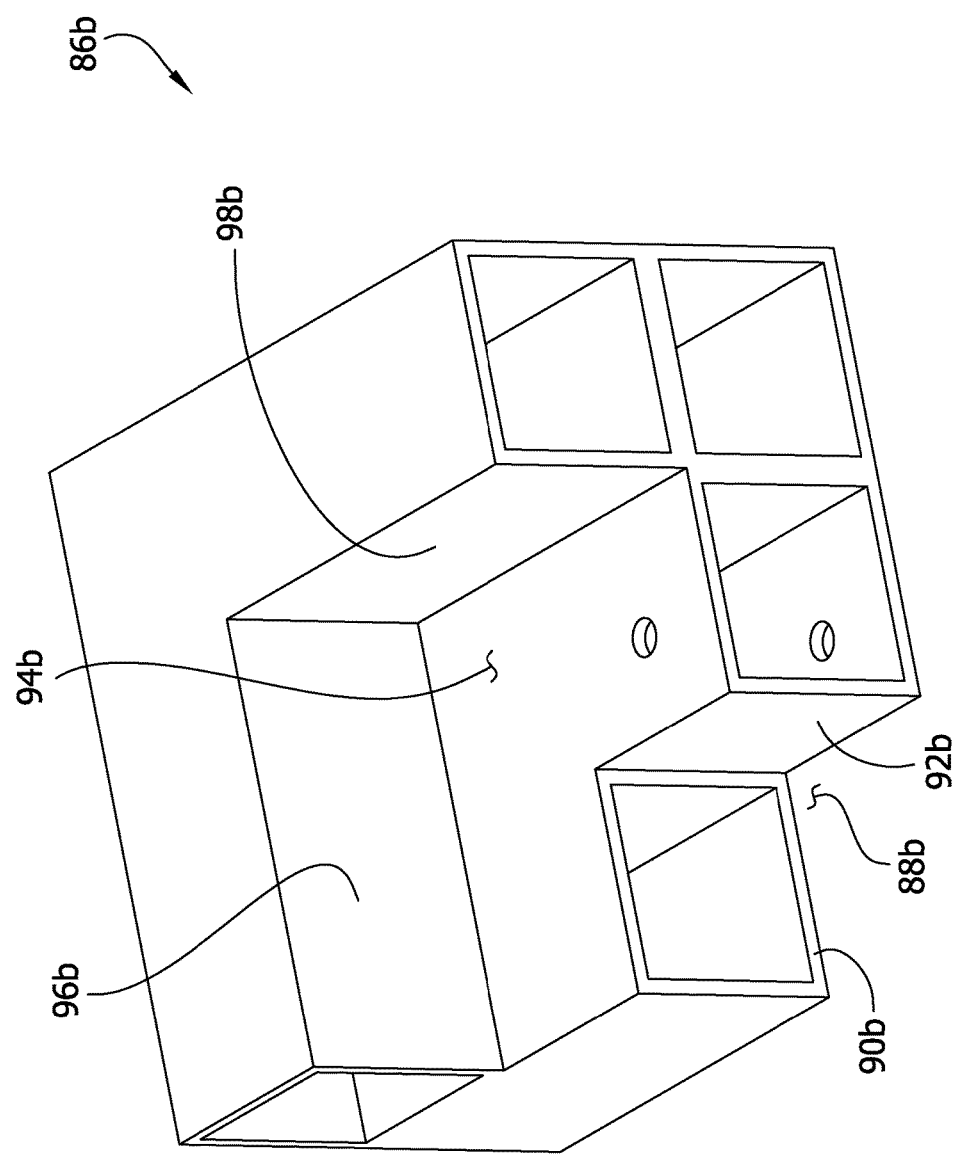
FIG. 30 is a perspective of a second corner jig.

A second corner jig 86*b* is shown in FIG. 30 to include a first recess 88*b* defined by an end wall 90*b* and a side wall 92*b*. The second corner jig 86*b* can be used by itself or in conjunction with the other corner jigs 86*a*, 186*a*, 186*b* to position the first and second panel members 16, 18 in the offset manner shown in the drawings to form the insulated panel 12. The first recess 88*b* is configured to receive the second panel member 18 such that the bottom portion 60 engages the end wall 90*b* and the second side portion 64 engages the side wall 92*b*. The second corner jig 86*a* further includes a second recess 94*b* positioned above the first recess 88*b* and defined by an end wall 96*b* and a side wall 98*b*. The side wall 92*b* is further from a side edge margin of the second corner jig 86*b* than the side wall 98*b*. The end wall 96*b* is closer to an end edge margin of the second corner jig 86*b* than the end wall 90*b*. When the second panel member 18 is positioned in the first recess 88*b* as described above, a portion of the second side mounting flange 74 and a portion of the bottom mounting flange 70 extends into the second recess 94*b*. The second recess 94*b* is configured to receive the first panel member 16 such that the bottom portion 30 engages the end wall 96*b* and the second side portion 34 engages the side wall 98*b*.

Figure 31:
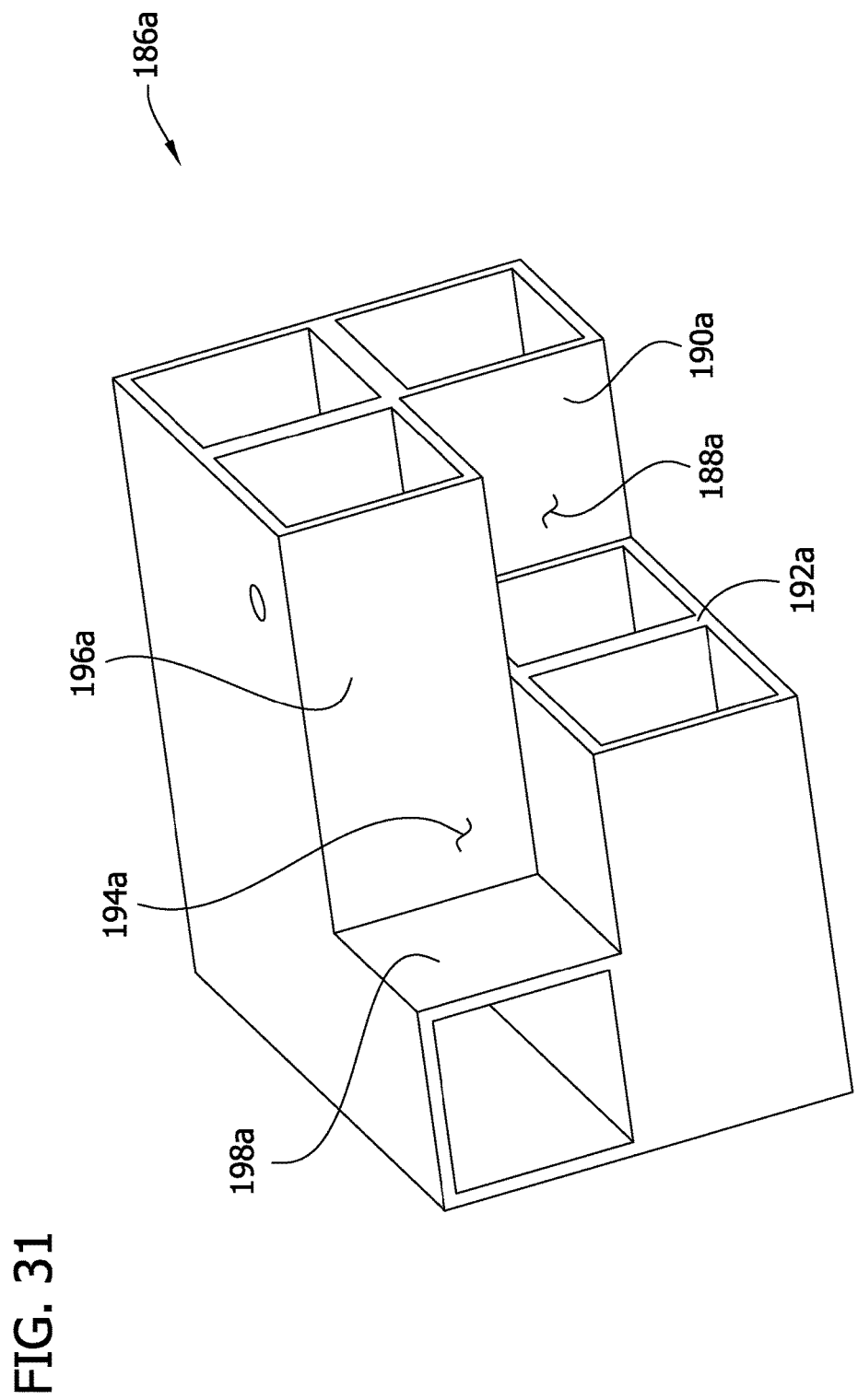
FIG. 31 is a perspective of a third corner jig.

Referring to FIG. 31, a third corner jig 186*a* is shown. The third corner jig 186*a* is configured for use (by itself or in conjunction with the other corner jigs 86*a*, 86*b*, 186*b*) in positioning the first side portion 32 of the first panel member 16 and the first side portion 62 of the second panel member 18 such that the side portion 62 of the second panel member extends beyond the side portion 32 of the first panel member. The third corner jig 186*a* includes a first recess 188*a* defined by a side wall 190*a* and an end wall 192*a*. The first recess 188*a* is configured to receive the second panel member 18 such that the top portion 58 engages the end wall 192*a* and the first side portion 62 engages the side wall 190*a*. The third corner jig 186*a* further includes a second recess 194*a* positioned above the first recess 188*a* and defined by a side wall 196*a* and an end wall 198*a*. The side wall 190*a* is closer to a side edge margin of the third corner jig 186*a* than the side wall 196*a*. The end wall 198*a* is closer to an end edge margin of the corner jig 186*a* than the end wall 192*a*. The second recess 194*a* is configured to receive the first panel member 16 such that the top portion 28 engages the end wall 198*a* and the first side portion 32 engages the side wall 196*a*.

Figure 32:
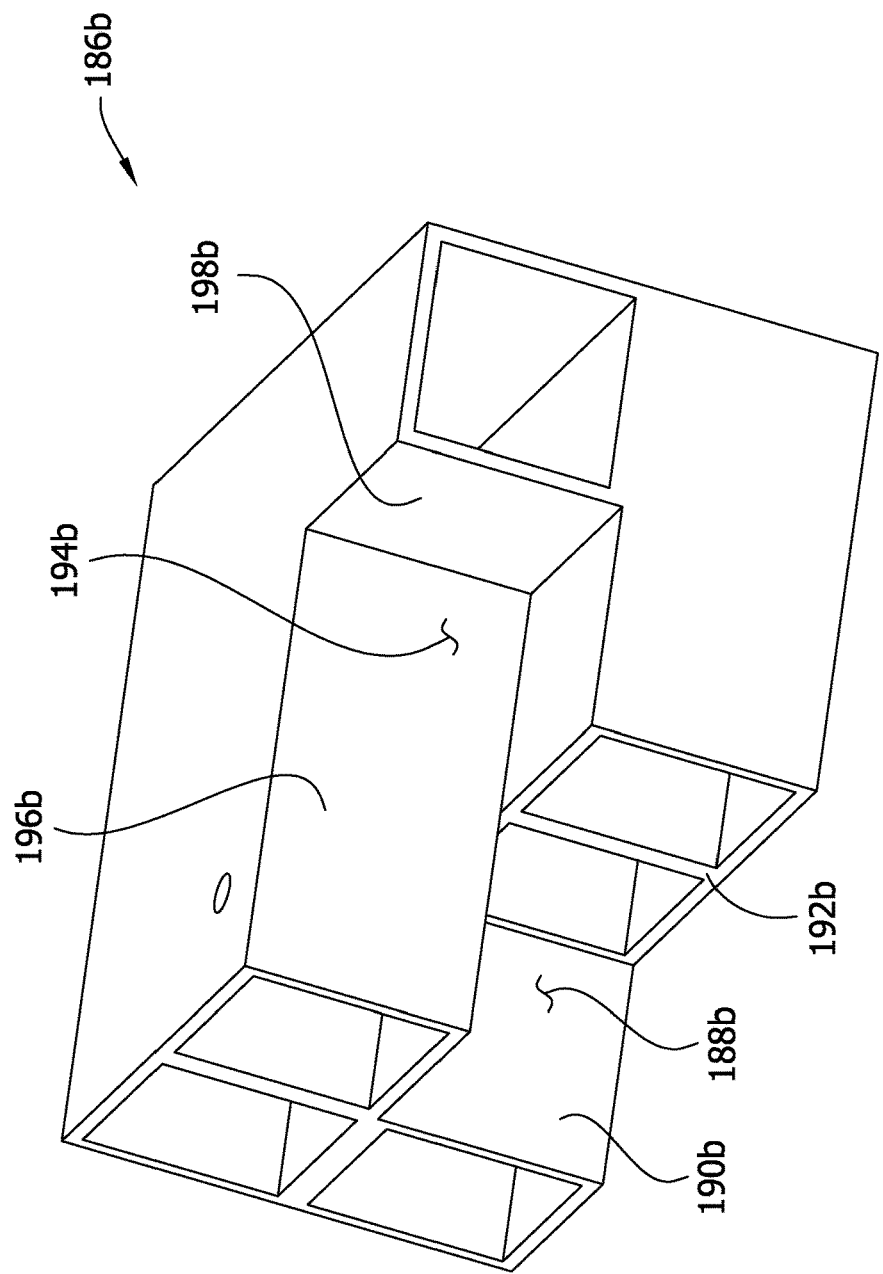
FIG. 32 is a perspective of a fourth corner jig.

A fourth corner jig 186*b* is shown in FIG. 32. The fourth corner jig 186*a* is configured for use (by itself or in conjunction with the other corner jigs 86*a*, 86*b*, 186*b*) to position the first and second panel members 16, 18 in the offset manner shown to form insulated panel 12. The fourth corner jig 186*b* includes a first recess 188*b* defined by a side wall 190*b* and an end wall 192*b*. The first recess 188*b* is configured to receive the second panel member 18 such that the bottom portion 60 engages the end wall 192*b* and the first side portion 62 engages the side wall 190*b*. The fourth corner jig 186*b* further includes a second recess 194*b* positioned above the first recess 188*b* and defined by a side wall 196*b* and an end wall 198*b*. The side wall 190*b* is closer to a side edge margin of the third corner jig 186*b* than the side wall 196*b*. The end wall 198*b* is closer to an end edge margin of the corner jig 186*b* than the end wall 192*b*. The second recess 194*b* is configured to receive the first panel member 16 such that the bottom portion 30 engages the end wall 198*b* and the first side portion 32 engages the side wall 196*b*.

Figure 33:
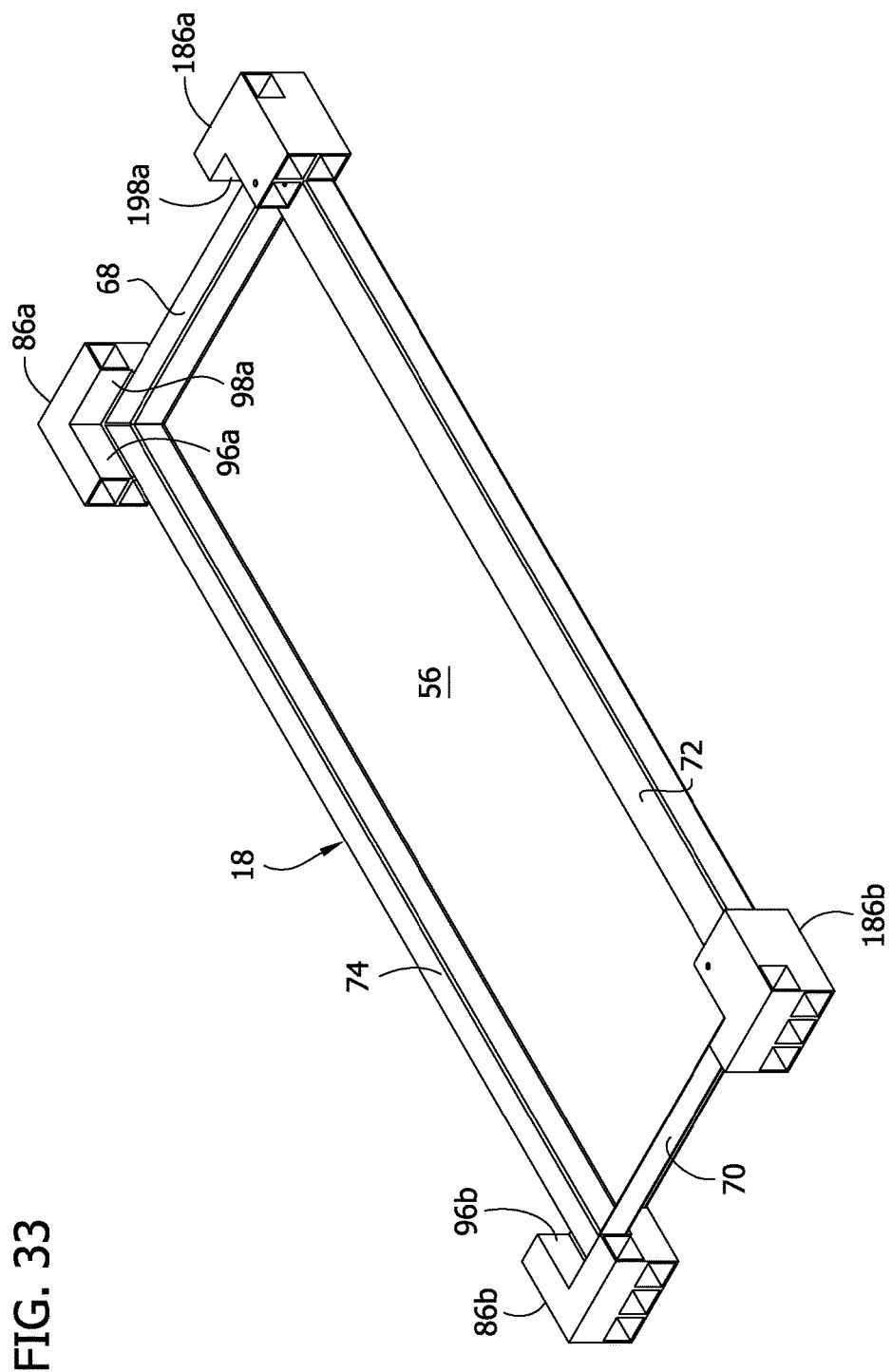
FIG. 33 is a perspective of the second panel member of FIG. 10 being positioned within the corner jigs of FIGS. 29-32, illustrating a first step to assembling the insulated panel assembly of FIG. 5.
Figure 34:
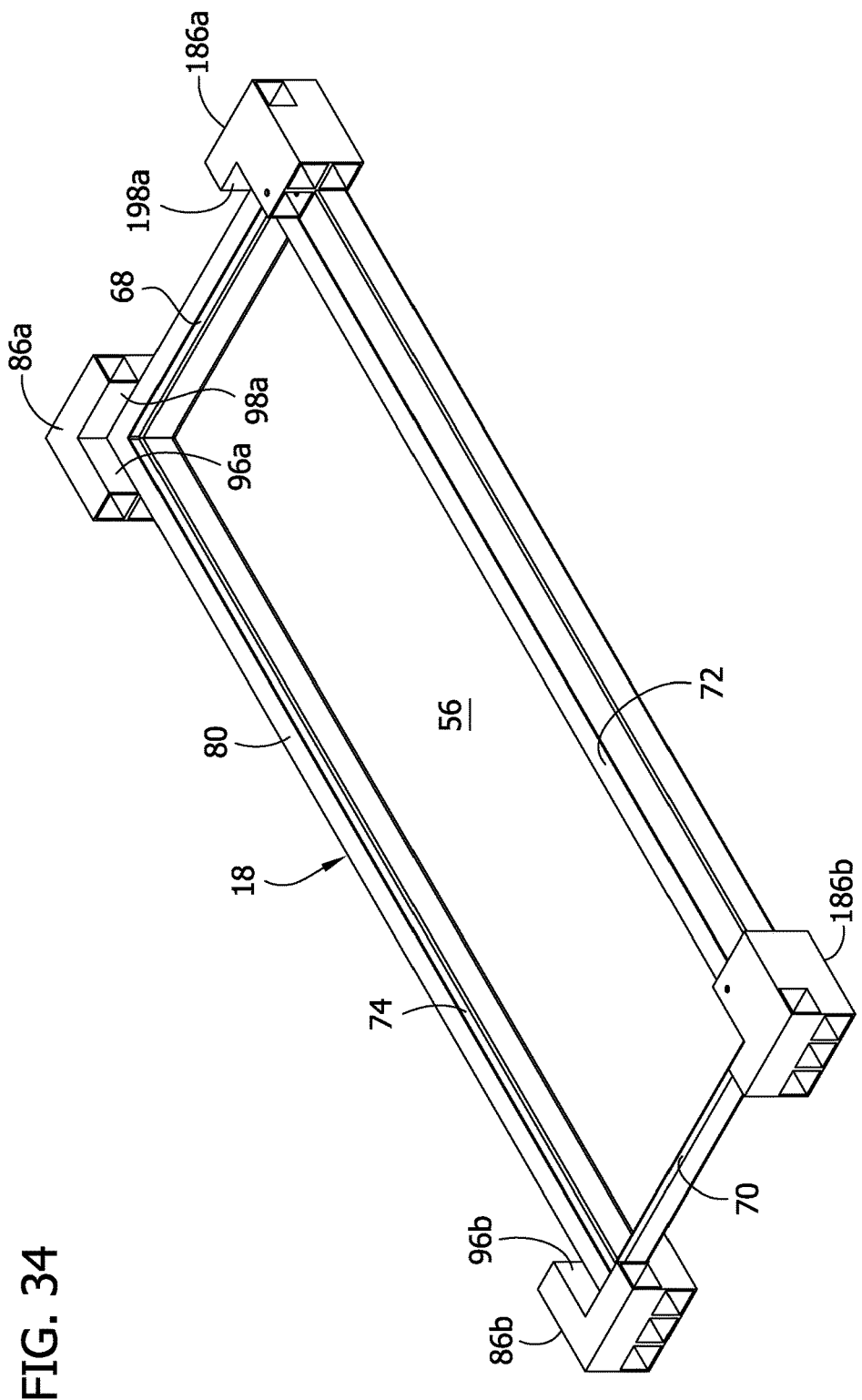
FIG. 34 is a perspective similar to FIG. 33, with double-sided adhesive foam strip applied to the second panel member, illustrating a second step to assembling the insulated panel assembly of FIG. 5.
Figure 35:
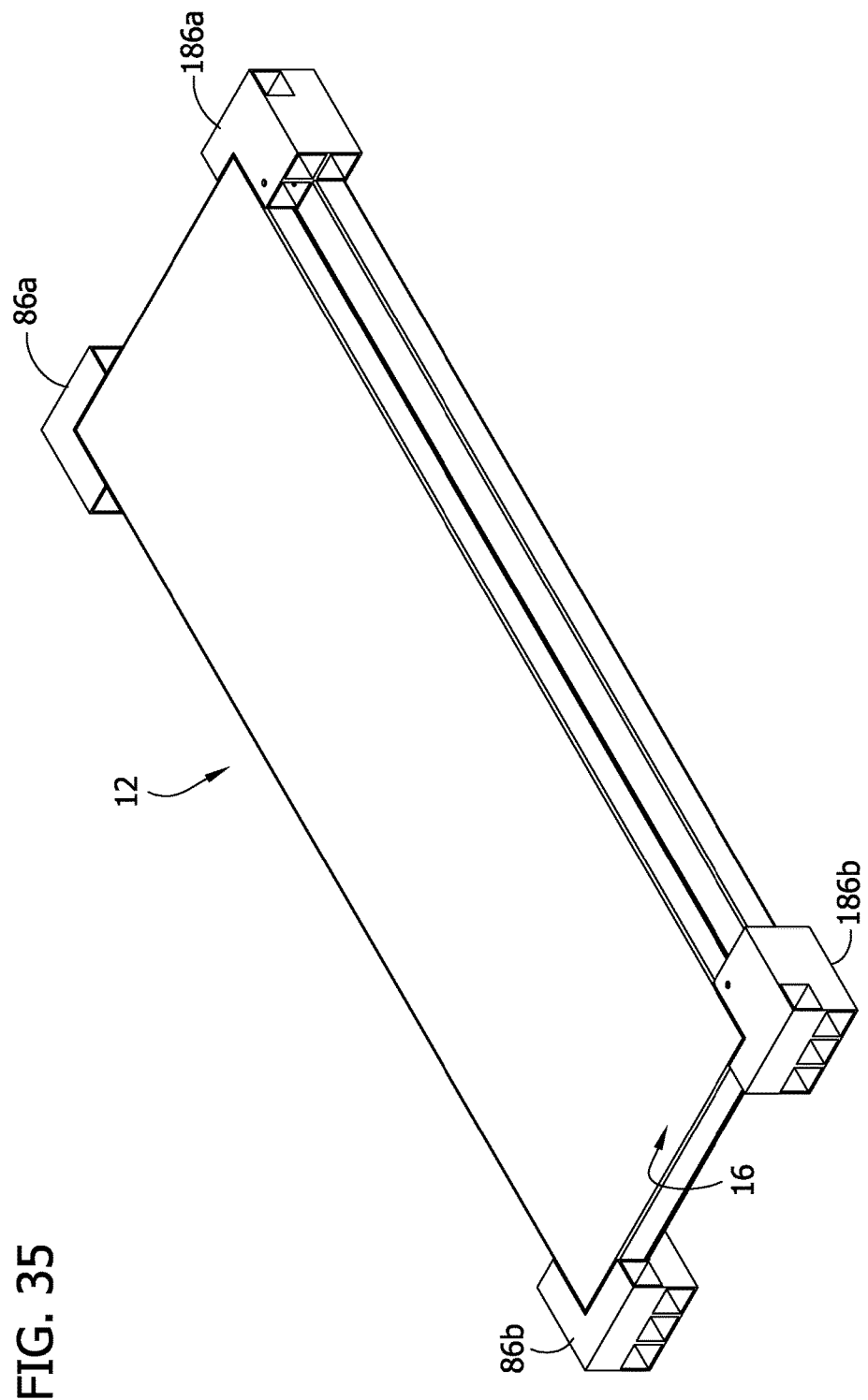
FIG. 35 is a perspective similar to FIG. 34, with the first panel member of FIG. 6 positioned on top of the double-sided adhesive foam strip, illustrating a third step to assembling the insulated panel assembly of FIG. 5.

To assemble an insulated panel assembly 12, first and second corner jigs 86*a*, 86*b* are placed at the top and the bottom of the second panel member 18 on the second side, and third and fourth corner jigs 186*a*, 186*b* are placed at the top and bottom of the second panel member on the first side (FIG. 33). Double-sided adhesive strip 80 is positioned on the mounting flanges of the second panel member 18. The first panel member 16 is then positioned in each second recess 94*a*, 94*b*, 194*a*, 194*b* as described above, thereby ensuring the double-sided adhesive strip 80 contacts and adheres to the mounting flanges of the first panel member and that the first and second panel members are positioned in the offset arrangement of the insulated panel assembly 12 described above (FIG. 33). The corner jigs 86*a*, 86*b*, 186*a*, 186*b* can be removed after the first and second panel members 16, 18 are attached to each other, or they can remain in place during the foam injection process and be removed after the panel assembly is completed.

To assemble an insulated panel assembly 112, first and second corner jigs 86*a*, 86*b* are placed at the corners of the second panel member 118 (not shown). Double-sided adhesive strip 180 is positioned on the mounting flanges of the second panel member 118, using the corner jigs 86*a*, 86*b* as a guide for positioning the strip by running the strip immediately adjacent the side and end walls of each second recess 94*a*, 94*b*. The first panel member 116 is then positioned in each second recess 94*a*, 94*b* as described above, thereby ensuring the double-sided adhesive strip 80 contacts and adheres to the mounting flanges of the first panel member and that the first and second panel members are positioned in the arrangement of the insulated panel assembly 112 described above (with the first panel member extending beyond the inner panel member on all four edge margins). The corner jigs 86*a*, 86*b* can be removed after the first and second panel members 116, 118 are attached to each other, or they can remain in place during the foam injection process and be removed after the panel assembly is completed.

The insulated panel assemblies 12, 112 as described above are easier to manufacture because the first and second panel members 16, 116, 18, 118 have only two bends at each of the edge margins. In addition, the panel assemblies 12, 112 are easier and quicker to assemble by using double-sided adhesive strip 80, 180, while still maintaining a thermal break between the first and second panel members 16, 116, 18, 118. The configuration of the panel assemblies permits simple overlapping arrangement of multiple panel assemblies to create the air handling enclosure 10. Corner jigs 86*a*, 86*b*, 186*a*, 186*b* further simplify the construction of the panel assemblies 12, 112 by maintaining the correct positional relationship between the first and second panel members for attachment by the double-sided adhesive strip.

As seen in FIGS. 1-4, multiple insulated panel assemblies 12, 112 are attached together to form the air handling enclosure 10. As shown in FIG. 4, adjacent panel assemblies 12*a*, 12*b* are positioned in overlapping arrangement and attached with fasteners 84 (e.g., self-drilling and self-tapping screws). The first side portion 32*a* of the first panel member 16a of the first panel assembly 12a is positioned adjacent the second side portion 34b of the first panel member 16b of the second panel assembly 12b, and the first side portion 62a of the second panel member 18a of the first panel assembly is positioned adjacent the second side portion 64b of the second panel member 18b of the second panel assembly. The first side mounting flange 72a of the second panel member 18a of the first panel assembly 12a overlaps the second side mounting flange 44b of the first panel member 16b of the second panel assembly 12b. Fasteners 84 are inserted through the base portion 52a of the first panel assembly 12a and the second side mounting flange 74b of the second panel assembly 12b to attach the first and second panel assemblies to each other. The fasteners 84 extend only through the second panel members 18a, 18b and do not extend through or contact the first panel members 16a, 16b to avoid creating a thermal bridge between the inner and first panel members. Panel assemblies 112 can also be attached as described above, by overlapping a portion of the panel assembly and inserting a fastener 84 through only the second panel members of adjacent panel assemblies 12, 112. The panel assemblies 12, 112 can be attached to each other such that the first panel members are generally co-planar, or such that the first panel members are angled relative to each other (e.g., at about 90 degrees).

Having described the invention in detail, it will be apparent that modifications and variations are possible without departing from the scope of the invention defined in the appended claims.

When introducing elements of the present invention or the preferred embodiment(s) thereof, the articles "a", "an", the and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. An insulated panel assembly for use in forming an air handling enclosure, the insulated panel assembly comprising:
    a first panel member having a base portion, first and second side portions projecting transversely from the base portion, and first and second side mounting flanges extending projecting transversely from the respective first and second side portions;
    a second panel member having a base portion, first and second side portions projecting transversely from the base portion, and first and second side mounting flanges projecting transversely from the respective first and second side portions; and
    a double-sided adhesive strip attaching the first and second side mounting flanges of the first panel member to the respective first and second side mounting flanges of the second panel member, the first and second panel members being arranged with respect to each other so that at least a portion of the second panel member extends beyond a corresponding portion of the first panel member;
    the first and second panel members defining and fully enclosing a cavity, the insulated panel assembly further comprising a thermally insulating core disposed in the cavity, a portion of the thermally insulated core extending laterally beyond the first side portion of the first panel member;
    wherein the insulated panel assembly is constructed to be arranged in a side-by-side, overlapping relationship with another insulated panel assembly having the same construction for use in forming a wall of the air handling enclosure.

2. An insulated panel assembly as set forth in claim 1 wherein the second side portion of the first panel member is disposed laterally outward from the second side portion of the second panel member.

3. An insulated panel assembly as set forth in claim 2 wherein the first side portion of the first panel member is disposed laterally outward from the first side portion of the second panel member.

4. An insulated panel assembly as set forth in claim 2 wherein the first panel member further comprises top and bottom portions from the base portion of the first panel member, and wherein the second panel member further comprises top and bottom portions from the base portion of the second panel member, the top and bottom portions of the first panel member being disposed laterally outward from the top and bottom portions of the second panel member.

5. An insulated panel assembly as set forth in claim 1 wherein the first and second side mounting flanges of the second panel member extend laterally inward from the first and second side portions of the first panel member.

6. An insulated panel assembly as set forth in claim 5 wherein the first and second side mounting flanges of the first panel member extend laterally inward from the first and second side portions of the first panel member.

7. An insulated panel assembly as set forth in claim 4 wherein the first panel member comprises top and bottom mounting flanges, the top and bottom mounting flanges extending laterally inward from the top and bottom portions of the first panel member.

8. An insulated panel assembly as set forth in claim 7 wherein the second panel member comprises top and bottom mounting flanges, the top and bottom mounting flanges extending laterally outwardly from the top and bottom portions of the second panel member.

9. An insulated panel assembly as set forth in claim 1 wherein there are no more than two bends between the base portion and the first and second side mounting flanges.

10. An insulated panel assembly as set forth in claim 1 wherein the first and second panel members are each made of one piece of sheet metal.

11. An air handling enclosure including a plurality of insulated panel assemblies as set forth in claim 1.

12. The air handling enclosure as set forth in claim 11 further comprising fasteners connecting adjacent panel assemblies, the fasteners extending only through the second panel members.

13. The insulated panel assembly as set forth in claim 1 wherein the base portions, the first and second side portions, and the first and second side mounting flanges of the first and second panel members cooperate to define the fully enclosed cavity.

14. The insulated panel assembly as set forth in claim 13 wherein the insulated panel assembly further includes opposite first and second sides, the first and second side portions and the first and second side mounting flanges of the first and second panel members fully defining the first and second sides of the insulated panel assembly, respectively.

15. The insulated panel assembly as set forth in claim 14 wherein the first and second side portions and the first and second side mounting flanges of the first and second panel members define and close opposite first and second sides of the cavity, respectively.

\* \* \* \* \*